T

(12) United States Patent
Smith et al.

(10) Patent No.: US 10,891,143 B2
(45) Date of Patent: Jan. 12, 2021

(54) SYSTEM, METHOD AND INTERACTIVE GUI FOR CREATING ON-DEMAND USER-CUSTOMIZED INSTRUMENTS

(71) Applicant: Choice Financial Solutions, S.L., Madrid (ES)

(72) Inventors: Daniel J. Smith, Madrid (ES); Iñigo San Martín, Madrid (ES); Emilio Fernández, Madrid (ES)

(73) Assignee: Raisin Technology Europe, S.L., Madrid (ES)

( * ) Notice: Subject to any disclaimer, the term of this patent is extended or adjusted under 35 U.S.C. 154(b) by 0 days.

(21) Appl. No.: 16/856,188

(22) Filed: Apr. 23, 2020

(65) Prior Publication Data

US 2020/0249966 A1  Aug. 6, 2020

Related U.S. Application Data

(60) Provisional application No. 62/925,970, filed on Oct. 25, 2019.

(51) Int. Cl.
| | | |
|---|---|---|
| *G06F 16/00* | (2019.01) | |
| *G06F 9/451* | (2018.01) | |
| *G06F 16/22* | (2019.01) | |
| *G06Q 40/02* | (2012.01) | |
| *H04L 29/06* | (2006.01) | |
| *G06F 3/0484* | (2013.01) | |
| *G06Q 10/10* | (2012.01) | |
| *G06F 3/0482* | (2013.01) | |

(52) U.S. Cl.
CPC .......... *G06F 9/451* (2018.02); *G06F 3/04847* (2013.01); *G06F 16/2291* (2019.01); *G06Q 10/10* (2013.01); *G06Q 40/02* (2013.01); *H04L 63/0428* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2006/0020530 A1* | 1/2006 | Hsu | .............. | G06Q 40/06 705/35 |
| 2011/0125669 A1* | 5/2011 | Smith | .............. | G06Q 40/06 705/36 R |
| 2015/0206245 A1* | 7/2015 | Basu | .............. | G06F 3/0484 705/36 R |

* cited by examiner

*Primary Examiner* — Anhtai V Tran
(74) *Attorney, Agent, or Firm* — DLA Piper LLP (US)

(57) ABSTRACT

Interactive graphical user interfaces (GUI) are provided. Baseline data structures are received from among entity systems via data feed interfaces. An interactive GUI is generated on a display of a user device, comprising one or more screens to display the baseline data structures and user adjustment tools for customizing characteristics of a displayed structure. An adjustment indication is received from the user device via the interactive GUI, via the user adjustment tools. A characteristic of the displayed structure is adjusted responsive to the adjustment indication. Responsive to adjusting the characteristic, another characteristic of the displayed structure is adjusted, thereby reflecting an impact of the adjusting on the other characteristic, which adjusting and impact are dynamically displayed as the adjusting occurs, via the interactive GUI. A confirmation indication is received from the user device via the interactive GUI. A user-customized data structure is created responsive to the confirmation indication.

30 Claims, 23 Drawing Sheets

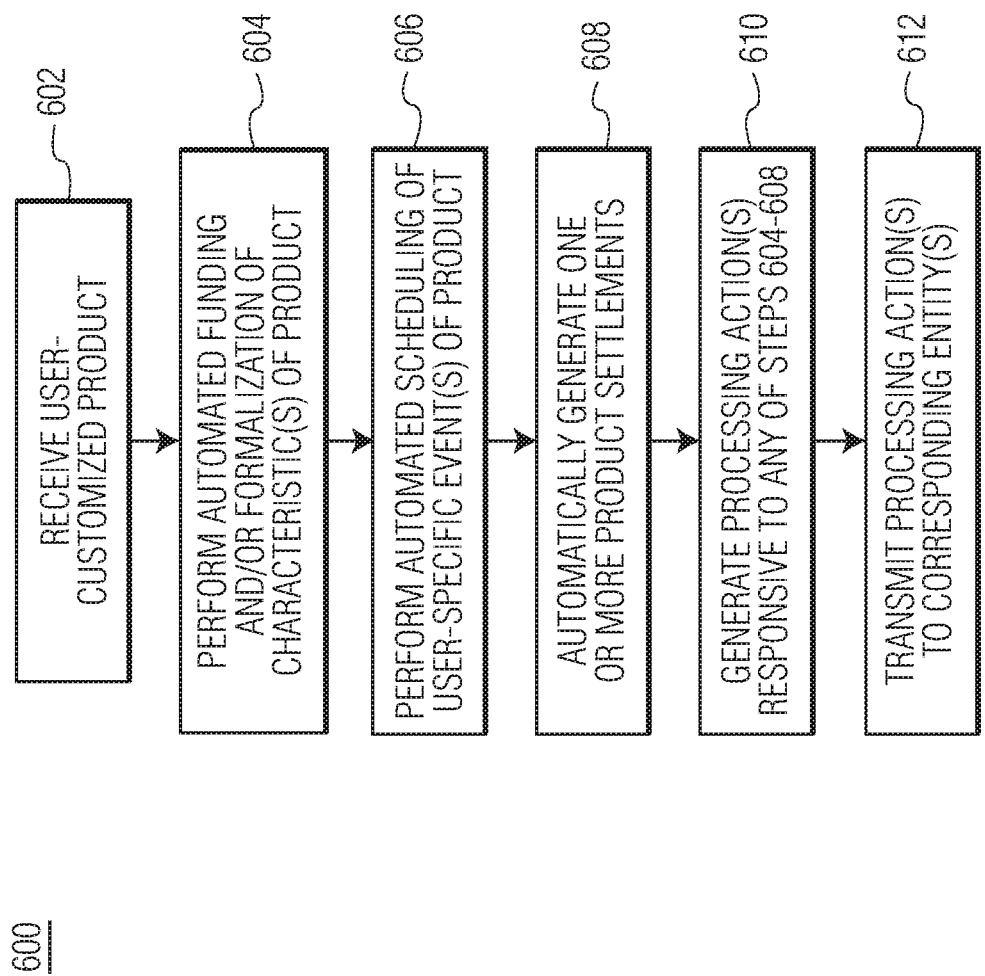

Figure 7C:
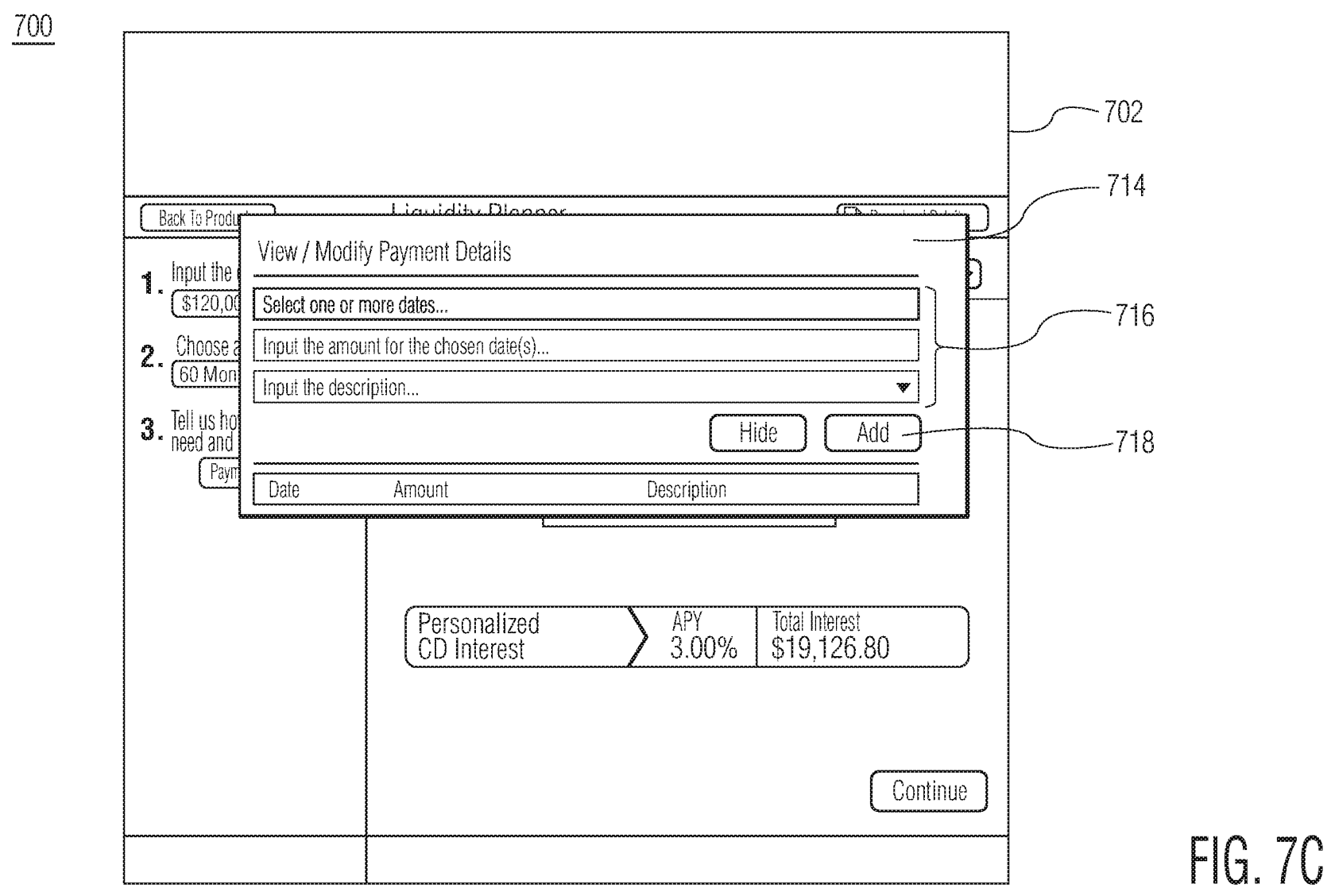

Back to Prod...
Liquidity Planner
View / Modify Payment Details

1. Input the    $120.00
2. Choose    60 Mon
3. Tell us ho... need and

Select one or more dates...
Input the amount for the chosen date(s)...
Input the description...

Hide    Add

Payn...
Date    Amount    Description

Personalized
CD Interest
APY        Total Interest
3.00%    $19,126.80

| FILTER CRITERIA | | | | | | |
|---|---|---|---|---|---|---|
| PREVIOUS DAY | 10/26/2016 | FOLLOWING DAY | | | RESET | SEARCH |

Data is automatically updated every 180 seconds
Last Update: 10/26/2016 18:36:43

| | SCHEDULED TIME | EOD MODEL | START | END | STATUS | SETS | LOG |
|---|---|---|---|---|---|---|---|
| ⊕ | 10/26/2016 18:35:54 | PRECLOSE | 10/26/2016 18:35:54 | 10/26/2016 18:36:23 | Finished | SetChoice,Set1,Set2 | |
| ⊕ | 17:00:00 | STANDARD | N/A | N/A | Pending | Set1,Set2,SetChoice | |
| ⊕ | 04:00:00 | REPORT | N/A | N/A | Pending | Set1,Set2,SetChoice | |

| FILTER CRITERIA | | | | | | | | |
|---|---|---|---|---|---|---|---|---|
| PREVIOUS DAY | 11/03/2016 | | FOLLOWING DAY | | | RESET | SEARCH | |
| SCHEDULED TIME | EOD MODEL | START | END | STATUS | | | | |
| 11/03/2016 18:03:15 | PRECLOSE | 11/03/2016 18:03:15 | N/A | Running | SetChoice | | | LOG |
| | EOD PROCESSING SET | | | | | START | END | STATUS |
| DETAILS | Platform Pre-Close - SetChoice | | | Pending | | 18:03:15 | 18:03:17 | Finished |
| DETAILS | Bank Pre-Close - Set1 | | | N/A | | N/A | N/A | Pending |
| DETAILS | Bank Pre-Close - Set2 | | | N/A | | N/A | N/A | Pending |
| 17:00:00 | STANDARD | N/A | N/A | Pending | Set1,Set2,SetChoice | | | |
| 04:00:00 | REPORT | N/A | N/A | Pending | Set1,Set2,SetChoice | | | |

Data is automatically updated every 180 seconds
Last Update: 11/03/2016 18:03:24

| FILTER CRITERIA | | | | | | |
|---|---|---|---|---|---|---|
| | | | | | Data is automatically updated every 180 seconds | |
| | | | | | Last Update: 11/03/2016 18:03:24 | |
| PREVIOUS DAY | | 📅 11/03/2016 | FOLLOWING DAY | | RESET | SEARCH |

| | SCHEDULED TIME | EOD MODEL | START | END | STATUS | | SETS |
|---|---|---|---|---|---|---|---|
| ⊕ | 11/03/2016 18:03:15 | PRECLOSE | 11/03/2016 18:03:15 | 11/03/2016 18:03:47 | Finished | | SetChoice,Set1,Set2 | LOG |
| ⓘ | 11/03/2016 18:04:53 | STANDARD | 11/03/2016 18:04:53 | 11/03/2016 18:04:57 | Error | | SetChoice | LOG |

| EOD PROCESSING SET | | START | END | STATUS |
|---|---|---|---|---|
| DETAILS | Platform EOD – SetChoice | 18:04:53 | 18:04:57 | Error |
| DETAILS | Bank EOD – Set1 | N/A | N/A | Pending |
| DETAILS | Bank EOD – Set2 | N/A | N/A | Pending |

| ⊕ | 04:00:00 | REPORT | N/A | N/A | Pending | | Set1,Set2,SetChoice |

820, 804, 826, 822, 824

System Management / End Of Day Monitoring

800

EOD Processing Date 4/14/2016

SEARCH — 832

| | | |
|---|---|---|
| Actual Server Start: | 11/03/2016 18:04:53 | Actual Server End: 11/03/2016 18:05:27 |
| Message: | err | User Name: |

[RESET] [SEARCH] [BACK]

---

| USER | DATE | EXCEPTION |
|---|---|---|
| Oscar.Riopedre | 11/03/2016 18:04:59 | End of process - ConfidenceCheck - Entity:CHOICE - Result : 40 - KC: No Rates... |
| Oscar.Riopedre | 11/03/2016 18:04:59 | ERROR: Unexpected end due to process error - ConfidenceCheck - |
| Oscar.Riopedre | 11/03/2016 18:05:00 | Selected Execution Mode is From Last Error |
| Oscar.Riopedre | 11/03/2016 18:05:00 | Automatic Application Termination with Errors - Return Code = 1 |

[MORE] — 836

| PROCESS NAME | SINGLE PER SET | START | END | STATUS |
|---|---|---|---|---|
| GetSystemStatus | ✓ | 11/03/2016 18:04:53 | 11/03/2016 18:04:53 | Finished |
| SetSystemStatus | ✓ | 11/03/2016 18:04:55 | 11/03/2016 18:04:55 | Finished |
| ConfidenceCheck | ✓ | 11/03/2016 18:04:57 | 11/03/2016 18:04:57 | Error |
| MBMPublish_DropOff | ✓ | N/A | N/A | Pending |
| ProcessSystemTasks | ✓ | N/A | N/A | Pending |
| PromoteCampaignStatus | ✓ | N/A | N/A | Pending |
| PromoteCampaignGroupStatus | ✓ | N/A | N/A | Pending |
| SetSystemStatus | ✓ | N/A | N/A | Pending |
| SystemDateChange | ✓ | N/A | N/A | Pending |
| PromoteCampaignStatus | ✓ | N/A | N/A | Pending |

EOD Processing Set: Platform EOD - SetChoice
Scheduled Time: 11/03/2016 18:04:53
Actual Server Start: 18:04:53
Running Rules: AllBusiness;FederalHolidayNYSE EOD Model: STANDARD
Status: Error
Actual Server End: 18:04:57
Running Rule Applied: AllBusiness

VIEW LOG   BACK

BANKS

FIG. 8G

| | | | | EOD Processing Set: | Platform EOD - SetChoice | | EOD Model: | STANDARD |
|---|---|---|---|---|---|---|---|---|
| | | | | Scheduled Time: | 11/03/2016 18:04:53 | | Status: | Error |
| | | | | Actual Server Start: | 18:04:53 | | Actual Server End: | 18:04:57 |
| | | | | Running Rules: | AllBusiness,FederalHolidayNYSE | | Running Rule Applied: | AllBusiness |

VIEW LOG    BACK

| | PROCESS NAME | SINGLE PER SET | START | END | STATUS | BANKS |
|---|---|---|---|---|---|---|
| ⊕ | GetSystemStatus | ✓ | 11/03/2016 18:04:53 | 11/03/2016 18:04:53 | Finished | |
| ⊕ | SetSystemStatus | ✓ | 11/03/2016 18:04:55 | 11/03/2016 18:04:55 | Finished | |
| ⊙ | ConfidenceCheck | ✓ | 11/03/2016 18:04:57 | 11/03/2016 18:04:57 | Error | |
| | START | END | STATUS | | | BANKS |
| | 18:04:57 | 18:04:57 | Error | | | All |
| ⊕ | MBMPublish_DropOff | ✓ | N/A | N/A | Pending | |
| ⊕ | ProcessSystemTasks | ✓ | N/A | N/A | Pending | |
| ⊕ | PromoteCampaignStatus | ✓ | N/A | N/A | Pending | |
| ⊕ | PromoteCampaignGroupStatus | ✓ | N/A | N/A | Pending | |
| ⊕ | SetSystemStatus | ✓ | N/A | N/A | Pending | |
| ⊕ | SystemDateChange | ✓ | N/A | N/A | Pending | |

SYSTEM, METHOD AND INTERACTIVE GUI FOR CREATING ON-DEMAND USER-CUSTOMIZED INSTRUMENTS

TECHNICAL FIELD

The present disclosure generally relates to improving data structure management and, in particular, to management systems, interactive graphical user interfaces (GUIs) and methods for the creation and management of on-demand user-customizable data structures.

BACKGROUND

Problems exist in the field of electronic data structure creation, customization and management. Conventional systems typically offer a fixed set of data structures for selection by users. This is because conventional systems have no means for creating and/or customizing data structures on the fly, or for managing such customized data structures throughout their respective life-cycles. As a result, the data structures offered by conventional systems are typically very similar to each other, and they provide little to no variability or adjustability in respect of the key data structure features, characteristics and/or parameters. Instead, 'variability' is achieved by pre-programming conventional systems with a small, pre-defined set of data structures, each varying only slightly from the others. However, since there are nearly endless combinations of features, characteristics and parameters that may define data structures, conventional systems clearly fall well short of offering all viable data structure configurations. Moreover, since the pre-defined data structures are essentially fixed and unchangeable, these data structures cannot easily be adapted to the specific needs of individual users.

As indicated above, conventional systems generally only offer a relatively small, limited set of pre-defined data structures. This is due, in part, to the significant computational burden, cost, complexity and continual system maintenance needed to both create and manage each additional variation of data structure. Indeed, creating a data structure that varies even slightly (e.g., having a different parameter definition or expiration date) from an existing data structure would require the system to be manually updated and re-programmed (e.g., re-configured) to process this entirely new data structure and to manage it throughout its lifecycle; and each additional variation would similarly require such updating and re-programming. In addition, the system would need to allocate additional system resources (e.g., memory, processor, etc.) to accommodate all aspects of each new data structures. This is computationally exhausting, impractical and cost prohibitive.

In order to avoid system re-programming and re-configuring, continual system updating and maintenance, increased drain on system resources, and other challenges, conventional systems simply avoid offering any 'customization' or variability beyond their respective pre-defined set of data structures. Said another way, systems offering truly customizable data structures do not exist.

Instead, because of the systematic deficiencies noted above, truly customized data structures may alternatively and theoretically be created and managed manually, outside of the constraints of conventional systems. However, because of the inefficiencies, inaccuracies and other challenges inherently associated with manual creation and management of data structures, this alternative does not present a viable option. Indeed, manually creating and/or managing a data structure of the type described herein requires monitoring of real-time data, extracting data from multiple data sources, making real-time calculations and adjustments in response to changes in the real-time data, and triggering other (external) systems to initiate processes and routines. Humans are incapable of capturing, processing and/or initiating anything in real-time, let alone the volumes of data and functions associated with creating, processing and managing said data structures. As a result, an attempted manual customization process would inevitably lead to inaccurate underlying data and calculations in the data structure. Such inaccuracies would be particularly exacerbated for data structures having complex relationships and/or that are dependent upon voluminous and/or highly volatile real-time data.

Moreover, it is noted that the processing and managing of these data structures are acutely time-sensitive. Thus, even if (arguendo) it were theoretically possible for a human to perform the foregoing customization functions and procedures, the human delay associated with such functions and procedures would certainly lead to stale and outdated results. Thus, any attempted manual alternative, if possible, would be unfeasible, impractical, and inaccurate, at best.

Accordingly, there is a need for a system, an interactive graphical user interface (GUI), and method for creating any number of truly and user-customizable data structures on the fly that can be automatically and fully managed throughout their respective life-cycles, without increasing the computational burden for handling such data structures.

SUMMARY

Aspects of the present disclosure relate to systems, methods and non-transitory computer-readable mediums providing an interactive graphical user interface (GUI) for creating on-demand user-customizable data structures. A system includes at least one computer server configured to communicate with one or more entity systems and at least one user device. The at least one computer server is configured to receive, via one or more data feed interfaces, one or more baseline data structures from among the one or more entity systems and generate an interactive GUI on a display of the at least one user device. The interactive GUI includes one or more screens configured to display the one or more baseline data structures and one or more user adjustment tools for customizing characteristics of a displayed structure among the one or more baseline data structures. The at least one computer server is further configured to receive, from the at least one user device via the interactive GUI, at least one adjustment indication via the one or more user adjustment tools; adjust, responsive to the at least one adjustment indication, at least one characteristic among the characteristics of the displayed structure; update, responsive to the adjusting of the at least one characteristic, at least one other characteristic among the characteristic of the displayed structure, thereby reflecting an impact of the adjusting on the at least one other characteristic; and dynamically display, via the interactive GUI on at least one among the one or more screens, the adjusting of the at least one characteristic and the impact of the adjusting on the at least one other characteristic as the adjusting occurs. The at least one computer server is further configured to receive, from the at least one user device via the interactive GUI, input comprising a confirmation indication and create a user-customized data structure responsive to the confirmation indication received from the at least one user device via the interactive GUI.

BRIEF DESCRIPTION OF THE DRAWINGS

FIG. 6 is a flowchart diagram of an example method for managing a lifecycle of a user-customized product, according to an aspect of the present disclosure.

FIGS. 7A, 7B, 7C, 7D, 7E, 7F and 7G are example screenshots of an interactive GUI creating user-customized products, according to an aspect of the present disclosure.

FIGS. 8A, 8B, 8C, 8D, 8E, 8F and 8G are example screenshots of an interactive administrator GUI, according to an aspect of the present disclosure.

DETAILED DESCRIPTION

Figure 1:
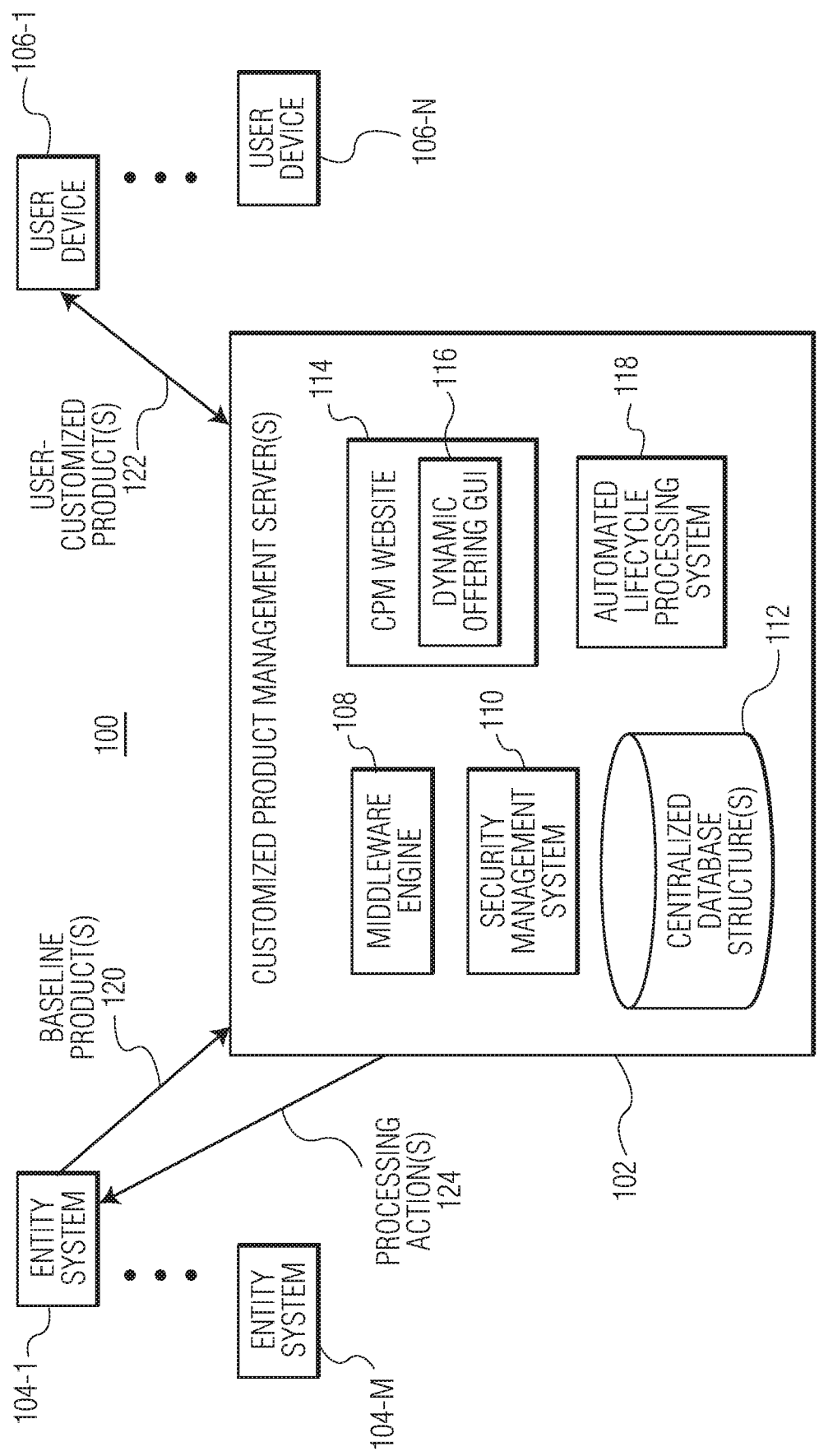
FIG. 1 is a functional block diagram of an example data structure management system for creating and managing user-customized products, according to an aspect of the present disclosure.

Aspects of the present disclosure relate to systems, methods and non-transitory computer-readable storage media for creating and managing user-customized data structures without modifying key components of an underlying baseline data structure and without needing to re-program, continually update or re-configure said systems. In some examples, an interactive GUI may be specially configured to present baseline data structures (also referred to as "baseline structures") on a display device together with user-adjustment tools for adjusting (e.g., fully customizing) one or more customizable parameters/characteristics of the baseline structure(s). The interactive GUI may also display user-selection tools (e.g., with no baseline structure), such that a user may select one or more baseline structures to customize. In response to user input (e.g., user-indicated adjustments and/or selections), the interactive GUI may display the creation of the baseline structure, as well as the dynamic impact of user-indicated adjustments on the baseline structure(s) itself, including the effect on characteristics/parameters of the baseline structure(s), on the display device, in real-time. This may be accomplished, for example, by connecting to and/or monitoring any number of external systems (e.g., over a network), such that, in response to the user-indicated adjustments or selections, a system of the present disclosure may extract and/or obtain pertinent real-time data from the external system(s), perform real-time calculations and determinations, generate characteristic/parameter adjustments, and dynamically display the impact of such adjustments on the GUI. As the pertinent data changes, the visual display on the GUI will dynamically change to reflect such data changes.

In some examples, the system may be configured to automatically manage data handling for user-customized data structure(s) over a lifecycle of the customized data structure(s). This may be accomplished, for example, by connecting to any number of external system(s), and automatically initiating certain processes and routines such as (without limit): automatic formulation (e.g., funding) routines, generating and transmitting details of data structures for structure classification, generating accounting entries, creating and submitting regulatory/fiscal reporting data, creating analytics reporting information and data storage, auto-scheduling of event planning, auto-scheduling of settlement operations and other transactions, etc.

In some examples, the present disclosure may relate to systems, GUIs and methods for creating and managing user-customized data structures defining financial products. In some examples, the user-customized financial products may include user-customized liquid time deposits products. In some examples, the present disclosure may provide systems and methods for efficiently creating and managing user-customized liquid time deposits without restriction on a minimum transaction value and/or levels of customization in a manner that creates no incremental operational overhead for the systems offering such a solution.

According to an exemplary embodiment, a plurality of user-customized data structures, each defining a particular product, for example, and each comprising a baseline time deposit configuration defined by a rate curve and combinations of data variables such as available tenors and liquidity frequencies, may be created using one or more computing devices of the present disclosure. Once created, the plurality of user-defined/user-customized structures (also referred to as "structures" or "products") may be made available on a global or selective basis to users of external entity systems, who may be provided access to further customize the available structures, for example, using a computing device and/or computing system that may be networked via a wired or wireless communication network. Moreover, the plurality of customized products may be created based on data and information from a single entity system (e.g., bank, broker, investment firm, etc.), by networking and accessing data and information across multiple entity systems in communication with one another, and/or remotely via a user's personal computing device.

In one exemplary embodiment, an exemplary system according to the present disclosure may include one or more computing devices in communication with each other, each comprising a memory for storing instructions and at least one processor for executing said instructions. In one embodiment, at least one of the computing devices executes instructions that causes the system to create a plurality of user-customized product structures defining liquid time deposit products. These user-customized products may be created by receiving, into the system, user input comprising data and/or instructions relating to variables such as deposit tenor, notional amount, one or more liquidity event details, liquidity schedules, liquidity amount desired, date (e.g., maturity, liquidity, etc.), annual percentage yield (APY), interest, etc. Then, based on the user input, the system may create an underlying baseline time deposit product. In addition, each user input may cause the system to automatically adjust at least one customizable product parameter, and to reflect the impact of said adjustment on one or more other product parameters. For example, adjustment or entry of one parameter (e.g., APY) may impact a value of other parameters (e.g., the interest amount to be received, the tenor of the deposit, and any other number of product variables). These adjustments and their impact may be determined, for example, by connecting to and/or monitoring any number of external systems (e.g., over a network), such that, in response to the user-input, the system of this embodiment may extract and/or obtain pertinent real-time data from the external system(s), perform real-time calculations and determinations, and generate characteristic/parameter adjustments. In addition, the system may be configured to dynamically display the user-input and the impact of such adjustments on an interactive GUI (discussed below). As the pertinent data changes, the visual display on the interactive GUI will dynamically change to reflect such data changes.

In another embodiment, the exemplary system may further comprise a display and instructions that when executed cause the system to generate an interactive GUI. The interactive GUI (also referred to as simply "GUI") is configured to receive and display user input, and dynamically display baseline structures, user-defined products and the impact of certain adjustments on product parameters and characteristics. As indicated above, the GUI may be configured to automatically update and graphically display parameters and characteristics associated with customized products (e.g., APY, a total interest amount to be received, liquidity event schedule(s), projected liquidity event, final maturity of a deposit value, etc.). These parameters and characteristics may change as external data changes and/or as user input changes. Further, the system may automatically prepare and display summary reports reflecting all adjusted parameters and characteristics associated with each user-customized product. Once each adjusted parameter is confirmed, the system may automatically issue the one or more user-customized product(s).

According to some aspects, the present disclosure may provide methods, interactive GUIs and systems for creating user-customized products (such as liquid time deposit products) in an computationally viable manner, and without imposing product restrictions (e.g., minimum product value) or systematic limitations on the level of user-customization associated therewith. As a result, any number of users, as well as any types of users (e.g., from individuals to large institutional customers), are able to create, select and/or tailor customized products to their specific individual preferences and needs.

In an exemplary embodiment, aspects of the present disclosure may include providing for dynamic real-time price adjustment, liquidity scheduling, liquidity event management, and overall lifecycle management of customized products. Importantly, this is in sharp contrast to existing, conventional systems and methods that are incapable of creating/customizing products as disclosed herein (see discussion above). The present disclosure, on the other hand, provides for the automated creation, customization, updating, pricing and lifecycle processing of any number of user-customized products (e.g., including, without limit) liquid time deposits), having any number of permutations, simultaneously. As a result, entity systems desiring to offer such products and customization, whether at one physical location or across multiple locations, or via any electronic distribution channel, may now do so in a computationally efficient and viable manner.

In some examples, a user-customizable product in accordance with the present disclosure may be created by introducing a series of desired parameters into the system (e.g., liquidity events and dates, with either regular and/or irregular liquidity amounts). Underlying baseline product definitions may be created and made available by the system, together with other product parameters, such as published combinations of tenor, frequency, rate curves, etc.

An interactive GUI of the present disclosure may be configured to provide users with user customization tools to define a baseline product and to dynamically adjust parameters and/or characteristics of the baseline products as desired. The interactive GUI of the present disclosure may also be configured to dynamically adjust parameters (e.g., reprice the baseline product) to reflect the impact of user-selected adjustments and/or to reflect changes to real-time data (e.g., market data, interest rate data, index volatility, etc.), for example.

As indicated in the BACKGROUND, conventional systems are devoid of custom product creation and/or customization, particularly relating to structures defining time deposit products and the like. As a result, existing systems are only capable of offering a limited product catalogue, where the key product features cannot be altered, apart from basic characteristics (e.g., rate, term and fees). In this regard, conventional systems are limited to product offerings having pre-defined and unchangeable characteristics that cannot be easily adapted to the specific needs of individual users. Indeed, if changes to a particular product's parameters and/or characteristic are desired, a completely new product definition must be introduced and programmed into the conventional system, including an entirely new characteristic profile specific to each individual user request, with the consequence being the need to additionally and separately manage that new product through its life cycle. The foregoing may be illustrated by the following example. Suppose a conventional system offers a particular structure defining a time deposit product with a term of 5 years and an APY of 2.75%. If a user desired a time-deposit product of $100,000 with a term of 5 years that provided penalty free liquidity and repayment of $10,000 each year, an entirely new product structure would have to be defined and programmed into the conventional system. Here, the APY would have to be recalculated based on the time-value of funds and, as a result of system deficiencies, an automated repayment schedule would have to be manually configured to satisfy the defined desired liquidity schedule.

Notably, there could be an infinite number of combinations and permutations of user-defined parameter and/or characteristic, and liquidity transactions associated with such products may themselves be completely irregular. As a result, existing systems and technology would be required to create and program such systems with each individual combination/permutation as a new individual product structure. As will be appreciated by those skilled in the art, this would be impossible.

Given these limitations, conventional systems simply do not offer such customization. Instead, conventional systems continue offer static or fixed product catalogues, obliging users to choose from amongst the limited products available in the catalogue. Users are therefore prejudiced in not being able to optimize product structures to suite their particular needs. In an exemplary illustration, preventing user-defined customizations of a financial product structure, for example, could prevent a user from optimizing the yield on his product structure and/or force the user to surrender the liquidity on his funds. As a result, users who have quantified liquidity needs, or un-quantified liquidity concerns, are obligated to choose shorter-term time deposit products that generally provide a sub-optimal yield for the user's savings. This same situation is also sub-optimal for the system in that it creates a situation where the data gathering efforts for funding the system's balance sheet and lending activities becomes dependent upon shorter-term, less stable funding, something that is detrimental to the system's financial ratios as measured by regulatory authorities who encourage longer-term stable funding and enhanced liquidity coverage ratios.

Notwithstanding the foregoing, it may theoretically be possible for a conventional system to offer a new product structure that includes user-specific customizations. However, each new product structure would have to separately be defined and programmed into the conventional system; and since the conventional system is not configured to manage new product structures (beyond their pre-defined catalogue) through their life-cycles, each new product structure would need to be managed manually. To be clear, if another product having even a slight variation to an existing product is desired, another entirely new product would need to be defined and programmed into the system, and then manually managed. As a result of this combination of limitations and systematic deficiencies, conventional systems simply cannot and do not offer product creation and customization on the fly.

Accordingly, it would be desirable to have systems and methods for creating user-customized products (e.g., including financial product structures with automatic and personalized liquidity schedules, for example) on the fly, that can be offered and managed automatically (i.e., by the system) throughout the products' life-cycles in an economically viable and systematically-efficient manner, without having to re-program and continually update the systems offering such products, and without having to manually manage the new products.

Contrary to conventional systems, which price and manage non-customizable products individually, the present disclosure provides for collectively pricing and downstream management of any number of user-customized products and corresponding schedules (e.g., liquidity schedule associated with a particular product type), having any number of permutations. This is made possible, at least in part, because of the concept introduced herein of utilizing a 'baseline' structure as a starting point for any user-customized product. Indeed, a baseline structure of the present disclosure may include certain key underlying components (e.g., rate curve, tenor and available liquidity frequencies) that are generally common (i.e., do not need to change), regardless of the extent to which a product is to be customized. In other words, the key underlying components (also referred to as an underlying data structure) may be described as those components that are not generally adjusted when created user-customized products. As a result, systems according to the present disclosure may be pre-configured to process any baseline structure having these key underlying components; and since the baseline structure retains and continues to utilize these key underlying components, regardless of the extent to which other product components may be customized (i.e., across an unlimited number of user-specific permutations and configurations), the system of the present disclosure is able to automatically manage all desired downstream lifecycle processing without the need to re-program, update or otherwise modify the already existing system logic and code, thereby achieving the stated computational operational efficiency goals.

Referring now to FIG. 1, a functional block diagram of an example data structure management system 100 for creating and managing user-customized products (e.g., a type of data structure) according to the present disclosure is shown. System 100 may include at least one customized product management (CPM) server 102, one or more entity systems 104-1, . . . , 104-M (designated generally as entity system(s) 104, where M is greater than or equal to 1) and one or more user devices 106-1, . . . , 106-N (designated generally as user device(s) 106, where N is greater than or equal to 1, and where M may or not be equal to N). Although not shown, CPM server 102, entity system(s) 104 and user device(s) 106 may be communicatively coupled via one or more communication (e.g., wired and/or wireless) networks. The one or more networks may include, for example, a private network (e.g., a local area network (LAN), a wide area network (WAN), intranet, etc.) and/or a public network (e.g., the Internet).

In summary, CPM server(s) 102 may be configured to communicate with entity system(s) 104 and define and/or receive one or more baseline products 120 from among entity system(s) 104. CPM server 102 may also be configured to communicate with user device(s) 106 via dynamic offering graphical user interface (GUI) 116 of CPM website 114, in order to create one or more user-customized products 122. As described further below, user-customized product(s) 122 may be created based on baseline product(s) 120 such that user-customized product(s) 122 do not modify key underlying components of baseline product(s) 120. In some embodiments, the baseline product(s) 120 may themselves be created by the CPM server 102 based on input/data from the entity system(s) 104, user device(s) 106, or from external data sources (not pictured). CPM server 102 may further be configured to manage user-customized product(s) 122 over their entire lifecycle (via automated lifecycle processing system 118), and may communicate any processing action(s) 124 to a corresponding entity system among entity system(s) 104. Processing action(s) 124 may include any processing actions for execution by one or more of entity system(s) 104 (e.g., updating records, additional processing, updates to baseline product(s) 120, etc.) based on any events associated with the lifecycle of user-customized product(s) 122.

The entity system(s) 104 may comprise a server computer, a desktop computer, a laptop or any other computing device configured to capture, receive, store and/or disseminate any suitable data associated with baseline product(s) 120. In some examples, entity system(s) 104 may include a computing device configured to employ an internet browser for secured connections via a wired and/or wireless communications network to centrally hosted and managed CPM server(s) 102. In one non-limiting example, one or more of entity system(s) 104 may include sources of electronic financial data (e.g., banking rates, interest rates, live market data, etc.). In some examples, entity system(s) 104 may include a single entity system (e.g., entity system 104-1) and CPM server(s) 102 may be configured for in-house deployment including for physical and/or virtual machine configurations. In some examples, entity system(s) 104 may include one entity system (e.g., entity system 104-1) configured as a cloud computing environment, including, in some examples, as Infrastructure as a Service (IAAS) and/or Platform as a Service (PaaS) cloud services. In some examples, entity system(s) 104 may include multiple (e.g. M>1) entity systems, configured as a multi-entity platform deployment. In some examples, the multi-entity platform may include IaaS and/or PaaS configurations.

User device(s) 106 may comprise a server computer, a desktop computer, a laptop, a smartphone, tablet, or any other computing device known in the art configured to capture, receive, store and/or disseminate any suitable data. User device(s) 106 may include a display device, a user interface and a communication interface (e.g., a web browser) for communication with CPM website 114. The user interface and the display may be one component (e.g., a touchscreen display), may be separate components (e.g., a display and a pointing device) and or any combination thereof. In some examples, user device(s) 106 may include in-house terminal located within entity system(s) 104. In some examples, user device(s) 106 may include remote devices not associated with entity system(s) 104 (e.g., a user's smartphone).

In some non-limiting examples, baseline product(s) 120 may comprise financial products including liquid time deposit products. In some non-limiting examples, each financial product 120 may include a series of baseline parameters, a data series of rates and associated terms, and a separate data series of frequencies. One or more of entity system(s) 104 may be configured to create multiple versions of the data series, which may be used for configuring differentiated product offerings based on, without being limited to, delivery channel (e.g., physical channels such as a financial entity branch location vs. online channels), a user demographic profile, and/or a geographical location of the user. In some examples, entity system(s) 104 may be configured with a specialized system functionality for the transfer of baseline product(s) 120 (e.g., the input, import and/or export of data series comprising baseline product(s) 120) between entity system(s) 104 and CPM server(s) 102.

In some non-limiting examples, baseline product(s) 120 may be distributed to CPM server(s) 102 as an electronic catalog. In some examples, the electronic catalog may include a suite of data/information that may be utilized by CPM server(s) 102 for the management and control of product offerings, as well as a further suite of data/information and materials that may be used by dynamic offering GUI 116 for the dynamic presentation of products to user device(s) 106 and entity system(s) 104. In some examples, the management/control of product data/information may include, without being limited to, term, rate, frequency, active state (active/not active), applicable distribution channel and/or user demographic(s). In some examples, the presentation information may include, without being limited to, static product concept documentation, dynamic documentation for user-specified customized product(s), terms and conditions and/or disclosure information.

In some non-limiting examples, users may access a baseline product catalogue. The access may include remote access with user device(s) 106, via a wired or wireless communication network (e.g. the Internet, telecommunications network, etc.), on-site at one or more of entity system(s) 104 (e.g., a financial institution or broker), and/or via any other appropriate means or channels. In one example, a user may access baseline product(s) 120 remotely via user device(s) 106 (e.g., a personal computer, a mobile telephone, or any other mobile communications device). In another example, the user may enter entity system 104-1 and access a baseline product catalogue via an onsite computing device having a display screen and means for interacting with the computer device.

It may be appreciated that the techniques described herein for creating and managing user-customized data structures may be applied to data classes associated with other technical fields aside from electronic or financial products, such as, without being limited to, cancer research, seismic activity analysis, climate modeling, etc. Thus, although CPM server(s) 102 is described in some examples below with respect to data classes associated with financial data, CPM server(s) 102 may be used with any electronic data classes associated with any type of electronic data, including those having a fixed set of data structures. Examples of such data classes where user-customization may be desired may include, for example, healthcare treatment scheduling, traffic light patterns, and any other class of data where automated life-cycle management on a large scale of customized data structures is required.

CPM server(s) 102 may include middleware engine 108, security system 110, one or more centralized database structures 112, CPM website 114 including dynamic offering GUI 116 and automated lifecycle processing system 118. In some examples, one or more of components 108-118 may communicate with each other via a data and control bus (not shown). In some examples, CPM server(s) 102 may be configured to operate with multiple types of entity system deployment models with complete elastic scalability and business continuity configurations, and may provide optimized recovery point objective (RPO) and recovery time objective (RTO) in the case of a loss off key infrastructure and/or roll-over to a secondary site/region.

In some examples, entity system(s) 104 may be configured to communicate with CPM server(s) 102 via one or more data feed interfaces to CPM website 114. The data feed interface(s) may be specially configured as real-time connection(s). Thus, in operation, baseline product(s) may be distributed to CPM server(s) 102 from among entity system(s) 104 via the real-time data feed interface(s).

In some examples, each data feed interface may include security protection (e.g., encryption) associated with a corresponding entity system (e.g., entity system 104-1). In some examples, different entity system(s) 104 may include different data transfer formats. For example, in general, data feeds may be configured in one or more formats including, without being limited to, RSS (e.g., RDF Site Summary, Rich Site Summary, Really Simple Syndication), Atom, Resource Description Framework (RDF), comma-separated values (CSV), JavaScript Object Notation (JSON) and Extensible Markup Language (XML). In some examples, different entity systems(s) 104 may transmit the data with various unique, non-standard values and/or data formats (e.g., proprietary formats). Furthermore, in some examples, data content may correspond to different forms of data, such as different currencies, date formats, time periods, etc.

Middleware engine 108 may be configured to communicate with the various data feed interfaces via CPM website 114, and may at least one of reformat the received data (representing baseline product(s) 120) to a common format and/or normalize the data from among the data feeds, thereby forming unified data. In some examples, middleware engine 108 may include a parameterized middleware engine that may allow for the creation of completely automated data feed interfaces to and from entity system(s) 104 with any suitable type of automated data reformatting, and data value translation (e.g., normalization). Middleware engine 108 may be configured to perform the reformatting and normalization without impacting core processing on CPM sever(s) 102 that of entity system(s) 104.

Security management system 110 may include one or more encryption and decryption keys and may be configured to provide data security protection of data received via the data feed interfaces. In some examples, the encryption/decryption keys may include independent keys associated with respective entity system(s) 104. In some examples, the encryption/decryption keys may include independent encryption/decryption keys by institution for the case of multi-tenant deployments. Security management system 110 may be configured to provide automated encryption of all sensitive data stored in CPM server(s) 102, for example, the data stored in centralized database structure(s) 112, including independent encryption keys by institution for the case of multi-tenant deployments. In some examples, security management system 110 may operate synchronous with middleware engine 108 to decrypt received data from the data feed interface(s), permit middleware engine to perform the reformatting/normalization operations and then encrypt the now unified data from middleware engine 108. Security management system 110 may provide secure and unified data to centralize database structure(s) 112.

Centralized database structure(s) 112 may be configured to store baseline product(s) 120 (e.g., after unification and/or encryption), user-customized product(s) 122, processing action(s) 124, entity system information (e.g., data security, data format, normalization, any network identifiers, geolocation(s), etc.), and user information (e.g., personal, account, network identifier(s), geolocation(s), etc.). Centralized database structure(s) 112 may be configured to store any suitable information associated with entity system(s) 104, baseline product(s) 120, user device(s) 106 and user-customized product(s) 122 that may be useful for middleware engine 108, security management system 110, CPM website 114, dynamic offering GUI 116 and automated lifecycle processing system 118.

In some examples, centralized database structure(s) 112 may include a number of complex database structures that are capable of transparently supporting multiple instances of a Structured Query Language (SQL) server. Each structure may be configured to support multiple databases, where each database may be configured to support multiple financial institutions in a multi-tenant deployment.

In order implement a multi-tenant deployment, it is desirable that the data of each entity system 104, associated users and user accounts are completely segregated in a secure manner, and that each entity system 104 may only access their own data. Accordingly, CPM server(s) 102 may utilize a number of data access security mechanisms, in addition to applying data encryption that may employ, for example, individualized encryption keys and strings for each entity system 104.

In a non-limiting example, centralized database structure(s) 112 may include entity system details tables, entity system-specific dynamic documentation tables (e.g., for provision of entity system-specific documents for users, account information, registration forms, etc.), baseline product definition tables (e.g., definition of product characteristics and management of product behavior), entity system product and/or campaign definitions (e.g., for definition and management of product including control of distribution channels, user demographics, product builder (PB) tools, and offering availability status), etc. In some examples, offering availability status may allow entity system(s) 104 to dynamically adjust on a real-time basis which product/rate/term/frequency combinations to make available (or not to make available), to users and/or channels. Centralized database structure(s)112 may further include one or more tables related to entity system-specific product parameters, such as rate-terms, frequency, early withdrawal conditions; and user tables related to user details, accounts, account simulations, account documentation and account planned liquidity schedules, for example. In some examples, centralized database structure(s)112 may include one or more tables related to entity system-specific interface definition parameter tables including, without being limited to, data reformatting, data translation, data encoding, data handling and delivery mechanisms. In some examples, centralized database structure(s)112 may include one or more tables related to settlement information including, without being limited to, funding, interest payments, liquidity payments and maturity payments.

In some examples, CPM server(s) 102 may distribute an electronic baseline product catalog to one or more among entity system(s) 104 (and/or one or more sub-entities within a particular entity system such as within entity system 104-1) via the real-time (data feed) connection(s) to CPM website 114. The electronic catalog may be distributed based on data registered in centralized database structure(s) 112, such that CPM website 114 (via middleware engine 108 and security management system 110) may provide secure encrypted data to one or more of entity system(s) 104. In a non-limiting example, entity system(s) 104 may access one or more electronic baseline product catalogs held in CPM server(s) 102 and may obtain and utilize details from the catalog(s) via CPM server(s) 102, and where all processing and calculations may occur within CPM server(s) 102. At the same time or alternatively, entity system(s) 104 may elect to pull a distributed copy of at least one electronic baseline product catalog via a suite of application programming interfaces (APIs) that may be made available by CPM server(s) 102, including, in some examples, additional APIs for the performance of processing operations (e.g., calculations).

In some examples, configuration(s) of baseline product(s) 120 (e.g., in an electronic catalog), together with the introduction and activation (or deactivation) of data series comprising rate/term/frequency combinations may be performed in real-time by a respective entity system (e.g., entity system 104-1) via a secure connection to CPM website 114. Any changes applied by a particular one of entity system(s) 104 may be effective immediately in real-time (via the data feed interface). Because the data and electronic catalog configuration details may be maintained on a real-time basis by entity system(s) 104 via secure CPM website 114, data is immediately available to CPM server(s) where the same data is securely stored in centralized database structure(s) 112.

CPM website 114 may be configured to present one or more interactive webpages on user device(s) 106 for the presentation of baseline product(s) 120 and for the creation of user-customized product(s) 122. The content of the interactive webpages may be generated by dynamic offering GUI 116. In some examples, dynamic offering GUI 116 may provide a web interface (e.g., CPM website 114) that may be branded for each specific entity system 104. In some examples, the content of CPM website 116 itself (e.g., in terms of product offering and product attributes) may be dynamically generated without the need for programming intervention by technology staff. Examples of CPM website 114 with dynamic offering GUI 116 are described further below with respect to FIGS. 7A-7G.

Dynamic offering GUI 116 may be configured to create one or more webpages on CPM website 114 that provides user-customization of baseline product(s) 120 where the customization can be performed in real-time (through product builder or "PB" tool(s) 206, described further below). Dynamic offering GUI 116 generates a real-time interactive GUI that allows users (via user device(s) 106) to introduce input, including multiple adjustments to one or more baseline product(s) 120 (e.g., from a baseline product catalog configured by entity system(s) 104). As dynamic offering GUI 116 receives user input indicating adjustment(s) to baseline product(s) 120, GUI 116 dynamically refreshes other product characteristics presented on CPM website 114 that details the impact/effect of the user-defined adjustments. In some examples, changes to the product characteristics may automatically and dynamically be illustrated both numerically (e.g., in terms of APY and interest amount), as well as graphically. Because changes to the product characteristics are shown as the user adjustments are made, users may observe the impact of the adjustments in real-time. In some examples, dynamic offering GUI 116 may receive input defining one or more customized programmed liquidity events for a particular product, and in response, dynamic offering GUI 116 may dynamically display details of the impact and effect of the programmed liquidity events on product parameters.

In some examples, dynamic offering GUI 116 may be configured to utilize baseline product configuration parameters that have been defined by entity system(s) 104. Based on the baseline product configuration parameters, dynamic offering GUI 116 may be configured to control the features and degree to which a user may configure baseline product(s) 120. Dynamic offering GUI 116 may be configured to perform these controls and determinations on a real-time basis, and does not need to be reprogrammed for different entity system(s) 104, different baseline product catalogs and/or different parameterizations.

Automated lifecycle processing system 118 may be configured to receive user-customized products 122 from dynamic offering GUI 116 and may automatically manage the treatment (i.e., processing) of user-customized product(s) 122 (and/or baseline product(s) 122) over their lifecycle(s) and user accounts over their lifecycles. In summary, a lifecycle of a product or an account refers to the different stages (also referred to herein as events) that products/accounts may undergo, and identifies which stages (events) may be managed and controlled automatically by automated lifecycle processing system 118.

In one non-limiting example, lifecycle stages of a product may include at least one of rate/term maintenance, rate/term maintenance approval, frequency maintenance, offering activation and offering suspension. In one non-limiting example, lifecycle stages of an account may include at least one of account simulation, requested status (pending not funded), formalized status (account funded), interest accrual, interest payments and settlements, planned liquidity payments, early redemption requests and settlements (including in some examples penalty fees), maturity settlements, automatic rollovers, taxation reporting, management information system (MIS) reporting and statement data production.

In some examples, automated lifecycle processing system 118 may be configured to perform a daily processing of scheduled tasks for the management of accounts associated with one or more of entity system(s) 104. For example, automated lifecycle processing system 118 may be configured to perform one or more calculations associated with the scheduled tasks (described further below), and may then automatically extract all of the requisite data used by core processing system(s) of a corresponding entity system(s) 104. Based on different data feed interface definitions configured in CPM server(s) 102, middleware engine 108 may be configured to apply any automated data reformatting and data conversion rules to the extracted data and may generate a suite of electronic files that may be automatically transmitted in an (optionally) encrypted format (via security management system 110), as processing action(s) 124, for internal processing by respective entity system(s) 104. An example of automated lifecycle processing system 118 is described further below with respect to FIG. 3.

As discussed above, conventional technology does not allow for automated, creation of customizable products (e.g., deposits) on the fly that permit each user to define a totally personalized event schedule (e.g., for liquidity events). This is due, in part, to the significant operational challenges that conventional entity systems would face if they tried to manually manage and/or re-program such systems to offer this type of service with their current technology. Moreover, current technology and core systems are designed for the management and processing of high volume, static or homogeneous products and accounts. They are not equipped to handle user-customized products.

System 100 provides advantages over conventional systems that provide fixed data structures (e.g., a fixed set of non-customizable products). In system 100, for example, the underlying components of baseline product(s) 120 does not need to be reconfigured, and no new program code needs to be created by entity system(s) 104 to handle user-customized product(s) 122. System 100 (via CPM server(s) 102) allows entity system(s) 104 to configure customized products that may be specific to characteristics (e.g., funding) of a particular one of entity system(s) 104, without the need to reprogram the application code (at entity system(s) 104). In some examples, CPM server(s) 102 may provide a completely service-based/application programming interface (API) architecture that enables existing entity system(s) 104 to leverage functionality across multiple delivery channels as well as optimize and significantly reduce integration effort and time to configure and manage user-customizable products 122.

Figure 2:
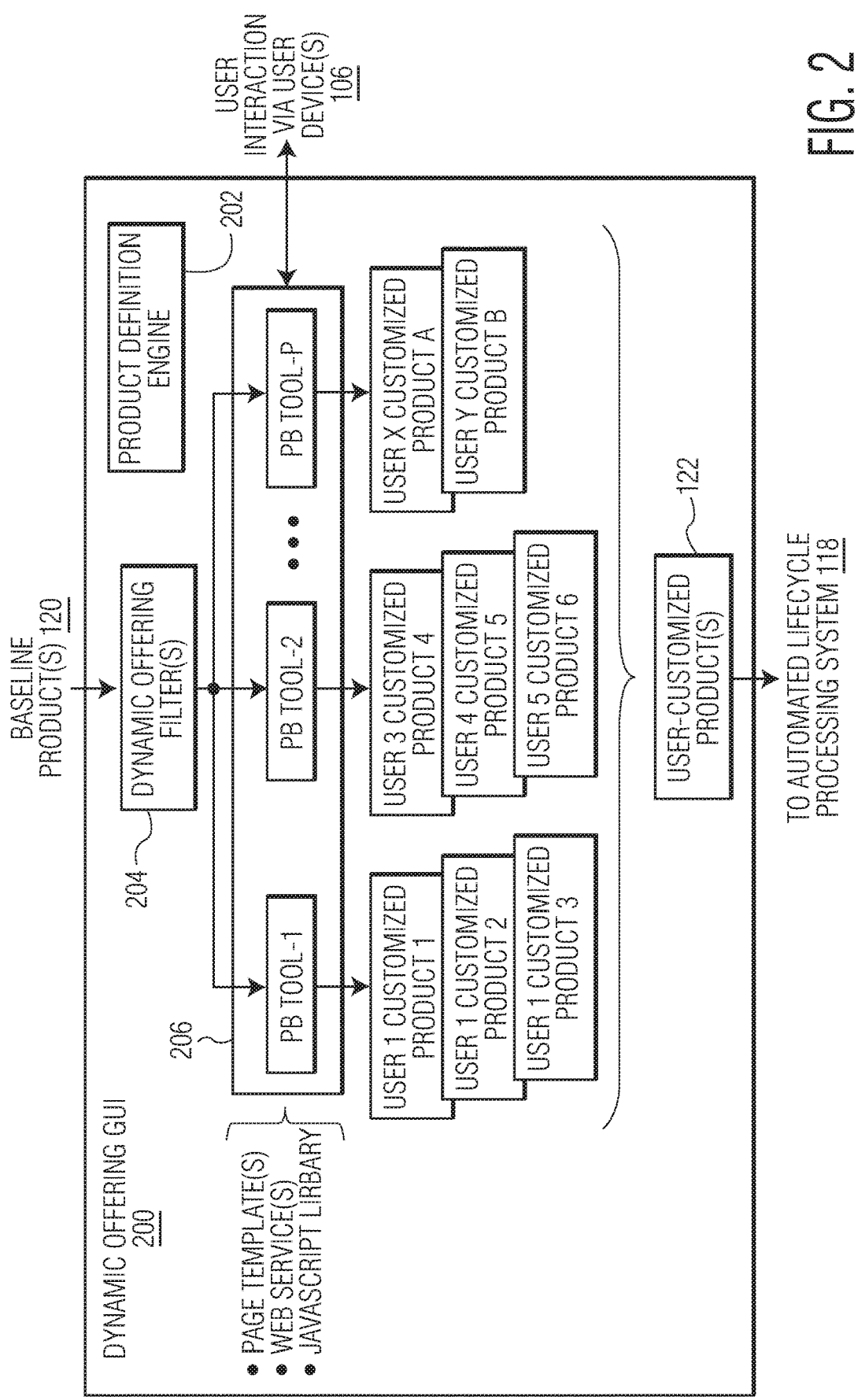
FIG. 2 is a functional block diagram of an example dynamic offering GUI, according to an aspect of the present disclosure.

Referring now to FIG. 2, a functional block diagram is shown of an exemplary dynamic offering GUI 200, according to an aspect of the present disclosure. Dynamic offering GUI 200 may include product definition engine 202, one or more dynamic offering filters 204 and one or more PB tools 206 (e.g., PB tool-1, . . . , PB tool P, where P is greater than or equal to 1). In some examples, dynamic offering GUI 120 may provide support for multiple languages, including, in some examples, multi-languages within a single installation for different user preferences. In this manner, users may interact with dynamic offering GUI 200 via one or more desired languages.

Product definition engine 202 may be configured as a parameterized engine that allows a non-technical user to create new products and customize product parameters in a computationally fast manner, without the need to undertake new programming. Product definition engine 202 may operate with PB tool(s) 206 to create new user-customized product(s) 122. In a non-limiting example, product definition engine 202 may be configured to create new products or any product that can be expressed as a series of known or conditional cash-flows. Data input (e.g., from user interaction via user device(s) 106) may be supported by one or more automatic data generation wizards.

Product definition engine 202 may include definition variables for the configuration of a new product. In some examples, the definition variables may include, without being limited to, at least one of general product description and details, calendar details (e.g., defining start and end date and/or term, events, guaranteed or contingent payment definitions expressed through a payout formula tool), market data parameters (e.g., option price, discount factors, etc.), product classification parameters (e.g., that may drive automated accounting engine 310 shown in FIG. 3), associated automatic and dynamic product documentation, and/or early withdrawal conditions.

Product definition engine 202 may be configured to control the product definition(s) and usage of PB tool(s) 206 for creating user-customized product(s). Product definition engine 202 may also be configured to control the definition(s) and usage of PB tool(s) 206 that allows a non-technical user to create new products in a computationally fast time with the associated product definitions that the user wishes to configure. In some examples, a product configuration wizard may allow a non-technical user to test PB tool(s) 206 and any product presentation before saving and publishing the user-customized product(s) 122. In some examples, product definition engine 202 may also be configured to control the definition(s) and usage of PB tool(s) 206 that allows a non-technical user to create new campaign offerings in a computationally fast time with the associated product definitions that the user wishes to configure. An example of creating products using multiple PB tool(s) 206 is further discussed below in connection with FIG. 10.

For purposes of this disclosure, a product is itself defined as a data structure comprising a combination of underlying components such as rate curve, tenor, etc., as well as other user-customizable components. Once constructed and/or customized, such a product may be offered by certain types of entities to users for purchase. In a non-limiting example, a product may comprise a baseline banking product that may be customized and offered by a banking institution to a user for purchase. A campaign, on the other hand, generally relates to how, when and to whom a product or products may be offered to users. For example, a campaign may dictate that a particular product (or group of products) be offered for a certain period of time, or may be a permanent off-the shelf offering. Another consideration of a campaign may refer to the definition and control by entity system(s) 104 of: distribution channel(s) in which product(s) are made available, customer demographics to which product(s) may be offered, "web" front-end(s) to be used to offer product(s), etc. In some examples, different web PB tool(s) 206 may determine and control which parameters/characteristics may be customized, and the extent of such customization. In some examples, a single product could be associated with more than one campaign, with each campaign providing different controls, limitations, user experiences and features, etc.

When configuring an offering of a product, dynamic offering GUI 200 may provide a user with the ability to associate the product to a particular campaign, and within the campaign define which PB tool 206 should be used. PB tool(s) 206 may provide a connection point between users and products. In some examples, any single product may be simultaneously distributed through multiple PB tools 206 (e.g., PB Tool-1, PB Tool-2, etc.). A product designer, for example, may define the type of users (e.g., sales force (such as retail bankers, licensed bankers, brokers), branches, customer segments) or channels that may access each campaign/PB tool(s) 206 and its related products. As a result, an entity (such as entity system(s) 104) may manage a single product, yet provide multiple experiences to its different types of users and distribution channels.

In some examples, campaign definition variables for the configuration and setup of a new campaign may include, without being limited to, at least one of general campaign details (e.g., availability dates, minimum amount(s) permitted, maximum amount(s) permitted, etc.), selection of a particular tool among PB tool(s) 206 to be used for presentation, selection of product(s) to be associated with the campaign, key description text to be presented to users and/or account administrators on CPM website 114, dynamic bullet text of key features to be highlighted to users and/or account administrators on CPM website 114, associated automatic and dynamic campaign documentation and/or distribution controls to determine which entity system(s) 104/channels may be permitted to offer the campaign to their users and/or account administrators.

Dynamic offering filter(s) 204 may be configured to receive baseline product(s) 120 and may filter the presentation of certain product offerings to user device(s) 106, and/or certain product characteristics (e.g., particular rate/term/frequency combinations) based on user preferences, user privileges, user location, system configuration, etc. In some examples, dynamic offering filter(s) 204 represent a software component of CPM server(s) 102. Dynamic offering filter(s) 204 may be completely transparent to the end user and/or may be used interactively by administrator(s) of entity system(s) 104.

For the example of interactive filtering by an administrator of entity system(s) 104, dynamic offering GUI 200 may present the administrator with a series of questions and/or list of drop-down values regarding a user's demographic details and/or user's product objectives. Dependent on the values elected by the administrator, the list of available products and the associated combinations of product characteristics (e.g., rate/term/frequency) may be automatically filtered by dynamic offering filter(s) 204 to present only those products appropriate to the inputs provided.

For the example of transparent filtering applied to end-user interaction, dynamic offering GUI 200 may automatically identify the origin of the user request (e.g., an online channel of entity system(s) 104, a marketplace channel, etc.). When the user is already authenticated via a login system of the channel, dynamic offering filter(s) 204 may apply one or more dynamic filtering rules based on one or more of user characteristics (e.g., a legal address, an IP address of user device(s) 106, etc.), as well as any other rules or criteria that can be configured including (but not limited to) an existing relationship between the user and entity system(s) 104 (e.g., other contracted products, transaction volumes, etc.). Based on the different filtering rules, dynamic offering filter(s) 204 may automatically filter baseline product(s) 120 to generate a list of available products and the associated combinations of product characteristics (e.g., rate/term/frequency). In this manner, dynamic offering GUI 200 may present only those products and characteristics on CPM website 114 that may be appropriate to the particular inputs.

PB tool(s) 206 may be configured to support the distribution of any product, or combination of products, as an offering to users (and account administrators), complemented by the ability generate dynamic, personalized data/information/documentation to users on the fly. PB tool(s) 206 may be configured to perform user-customization of baseline product(s) 120 in real-time.

In operation, PB tool(s) 206 may provide a real-time interactive GUI that allows a user to introduce input to causing one or multiple parameter adjustments to a baseline product(s) 120 (e.g., from a baseline product catalog) that has been configured by entity system(s) 104 and/or created by product management server 102. As the user inputs these adjustments (e.g., to product parameter(s)), PB tool(s) 206 may dynamically refresh the product characteristics on CPM website 114, and automatically present details of the effect of the user's adjustments. In some examples, the impact of the user's adjustments may be presented numerically (e.g., in terms of APY and interest amount) and/or graphically. In some examples, PB tool(s) 206 may be configured such that a user may observe the impact on changes to product characteristics, as well as details of different programmed liquidity events that may be input by the user into dynamic offering GUI 200, all in real-time as the adjustments are entered.

PB tool(s) 206 may be configured to use baseline product configuration parameters (from baseline product(s) 120) that have been defined by entity system(s). Based on the baseline product configuration parameters, PB tool(s) 206 may be configured to control the features and degree to which a user (via CPM website 114) may configure baseline product(s) 120. PB tool(s) 206 may be configured to perform the control of features/degree of configuration (and any calculations) on a real-time basis in such a manner that PB tool(s) 206 do not need to be reprogrammed for different entity system(s) 104, for different baseline product catalogs and/or for different parameterizations.

PB tool(s) 206 may provide benefits including allowing entity system(s) 104 to determine how a product should be presented to users. Another aspect of PB tool(s) 206 may include its ability to enable users to dynamically and intuitively adjust characteristic(s) of baseline product(s) 120 and receive real-time calculations and feedback regarding the impact of the choices and inputs. In some examples, the impact may be presented both through dynamic offering GUI 200 as well as via dynamically generated personalized electronic documentation. Moreover, PB tool(s) 206 may be configured to be entity system agnostic. Accordingly, PB tool(s) 206 may be able to intelligently and dynamically provide an entity-system-specific user experience based on the underlying criteria and parameters defined by each entity system 104 without the need to undertake any reprogramming specific to each entity system 104. PB tool(s) may enable users (e.g., clients, administrators) to dynamically personalize the characteristics of individual accounts without impacting the underlying data structure nor the components of CPM server(s) 102 that handle the lifecycle processing of the products.

In some examples, PB tool(s) 206 may include one or more page templates, one or more web services and at least one JavaScript library. The page template(s) may include a suite of Model, View, Controller (MVC) baseline page templates that may control dynamic offering GUI 200, where, dependent on data received via web services and JavaScript algorithms, the content/behavior/look and feel of the PB tool(s) 206 may be dynamically adjusted for each user.

The web service(s) may include a suite of web services configured to access, in real-time, underlying product descriptions and attributes, customized-product descriptions and attributes, campaign descriptions and attributes, available rate-term-frequency combinations, etc. that may be configured and maintained by each entity system 104. The data retrieved may be used by dynamic offering GUI 200 to dynamically determine what selections users may make and the selection of variables and account attributes permitted by each entity system 104. The web service(s) may also include a suite of web services that may be utilized by dynamic offering GUI 200 to provide dynamically generated personalized documentation for each user account simulation as well as to interact with the account opening flow for each user.

The JavaScript library may be configured to contain a suite of algorithms that may be utilized by dynamic offering GUI 200 to perform all real-time calculations and generation of any charts (or any other suitable graphically formatted results) that graphically represent the calculations, based on the entity system-specific data retrieved by the web services for the presentation of the data to users.

The concept of PB tool(s) 206 is powerful as it allows system administrators to define and control "How" a product should be presented to users (e.g., end-users or clients associated with particular entity system(s) 104). PB tool(s) 206 provide a connection point between users and underlying products. With dynamic offering GUI 200, any product (baseline product(s) 120 and/or customized product(s) 122) may be simultaneously generated via multiple PB tool(s) 206, PB tool(s) 206 allow entity system(s) 104 to provide associated users with multiple experiences with a single baseline product.

The systems and methods discussed herein are specifically configured to generate user-customizable products that feature simplicity, transparency and security. Data and details about a product, particularly when the product is being customized, may be configured to be presented to the user in a very clear and easy-to-understand manner—both through the dynamic GUI screen information (e.g. that may show a clear representation not only of a product parameter, e.g., APY), but also what the presented data may mean to the user (e.g., impact of user-defined parameter adjustments, in actual monetary amounts). The information may be presented both graphically as well as numerically via dynamic offering GUI 200, allowing for adjustments to the information which result in a clear (visual) representation of the impact of user-specified adjustments to the details of the product(s) (e.g., a product's APY). This same information may be complemented by dynamic documentation that provides extended details, information and considerations for a product.

In operation, when dynamic offering GUI 200 receives an indication from user device(s) 106 that the creation of user-customized product(s) 122 is complete (e.g., all of the desired adjustments and configurations of baseline product (s) 120 have been made), user-customized product(s) 122 may be submitted to automated lifecycle processing system 118.

Figure 3:
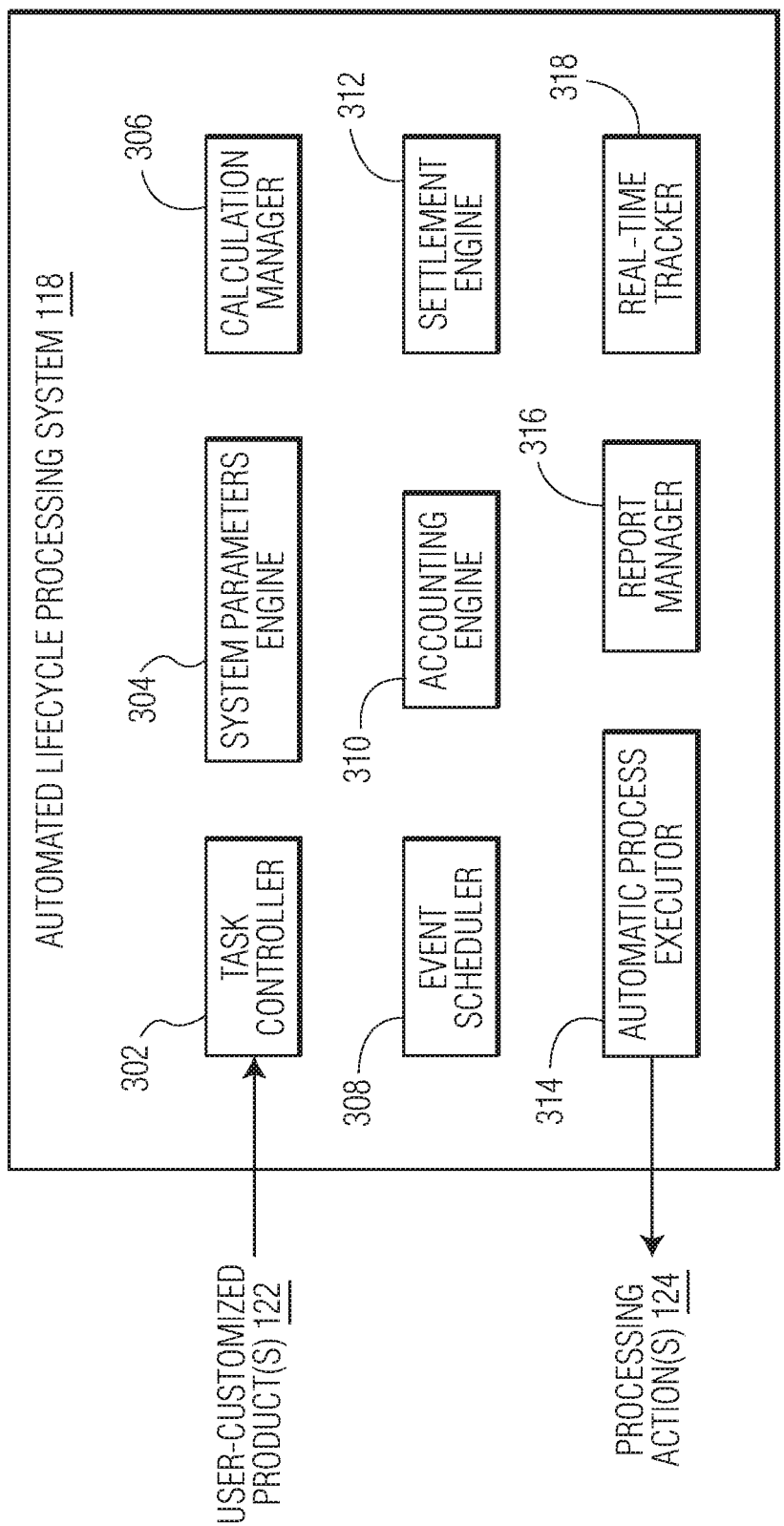
FIG. 3 is a functional block diagram of an example automated lifecycle processing system, according to an aspect of the present disclosure.

Referring now to FIG. 3, a functional block diagram of example automated lifecycle processing system 118 is shown. Automated lifecycle processing system 118 may include task controller 302, system parameters engine 304, calculation manager 306, event scheduler 308, accounting engine 310, settlement engine 312, automatic process executor 314, report manger 316 and real-time tracker 318. In some examples, automated lifecycle processing system 118 may further include one or more components for automatically generating governmental regulation(s) reporting data (e.g., tax reporting data). In some examples, components 302-318 may include processing engines configured to interpret and understand any product and account configured in CPM server(s) 102, and may manage lifecycle processing operations (e.g., calculation and generation of interest and principal payments, taxation reporting, early redemptions, accounting and regulatory reporting, etc.).

Task controller 302 may be configured to receive user-customized product(s) 122 (e.g., via dynamic offering GUI 116). Task controller 302 may manage the handling of user-customized product(s) 122 for one or more lifecycle operations specifically associated with individual ones of user-customized product(s) 122 (e.g., specific events, reporting, settlements, funding, etc.). Task controller 302 may be configured to control one or more of system parameters engine 304, calculation manager 306, event scheduler 308, accounting engine 310, settlement engine 312, automatic process executor 314, report manger 316 and real-time tracker 318 to perform various lifecycle operation tasks associated with user-customized product(s) 122.

System parameters engine 304 may be configured to store one or more parameters and/or information that may be useful for task controller 302, system parameters engine 304, calculation manager 306, event scheduler 308, accounting engine 310, settlement engine 312, automatic process executor 314, report manger 316 and/or real-time tracker 318. For example, system parameters engine 304 may store parameter(s)/information for performing lifecycle operation(s) on user-customized product(s) 122, automated daily processing operations, data tracking operations and/or reporting operations. In some examples, the system parameters may be configured and maintained in an independent manner by each entity system 104, such that the behavior and automated lifecycle treatment may automatically vary from one entity system (e.g., entity system 104-1) to another (e.g., entity system 104-2), without the need for intervention by a programming administrator.

Calculation manager 306 may be configured to store one or more formulas and/or algorithms that may be useful for task controller 302, system parameters engine 304, calculation manager 306, event scheduler 308, accounting engine 310, settlement engine 312, automatic process executor 314, report manger 316 and/or real-time tracker 318. For example, calculation manager 306 may store formula(s) and/or algorithm(s) that may be used for performing lifecycle operation(s) on user-customized product(s) 122, automated daily processing operations, data tracking operations and/or reporting operations.

Event scheduler 308 may be configured to identify one or more events associated with user-customized product(s) 122. Event scheduler 308 may automatically schedule (e.g., by communicating with one or more external systems) the identified event(s) over the lifecycle of each user-customized product(s) 122. Task controller 302 may be configured to use the scheduled events to control operation of one or more of accounting engine 310, settlement engine 312, automatic process executor 314, report manager 316 and real-time tracker 318. In one non-limiting example, the events may include user-specific liquidity events (e.g., where user-customized product(s0 122 may include one or more user-customized liquid time deposits).

Accounting engine 310 may include a parameterized engine and may be configured to perform fully automated generation of all accounting events and entries associated with user-customized products 122. In some examples, accounting engine 310 may be configured to perform and/or initiate (e.g., by communicating with one or more external systems) automated funding and formalization of user-customized product(s) 122. In some examples, accounting engine 310 may be configured to automatically generate any suitable regulatory reporting data (e.g., call report data) together with the associated accounting events/entries.

Settlement engine 312 may be configured to perform fully automated processing of all settlements associated with user-customized product(s) 122 over the product's lifecycle. For example, settlement engine 312 may initiate and perform settlement processing (directly, and/or via one or more external systems) from an initial funding of user-customized product(s) 122 through to a maturity of user-customized product(s) 122. Processing operations of settlement engine 312 may including, in some examples, interest management, backup withholding processing, early withdrawals and/or processing at scheduled events (e.g., liquidity events).

Automatic process executor 314 may be configured to perform automated daily processing operations for one or more user-customized product(s) 122 In some examples, the automated daily processing may correspond to end-of-day processing operations performed by entity system(s) 104. In some examples, the daily/end-of-day processing operations performed by automatic process executor 314 may take place through a series of different applications that automatically run in the background. In some examples, automatic process executor 314 may include launcher, executor and associated batch process applications for running the processing operations in the background. The applications of automatic process executor 314 may be configured to be independent of any task controllers of automatic process executor 314 that may invoke the actual execution of the corresponding end of day processes.

Automatic process executor 314 may be configured to optimize the daily/end-of-day processes, and may perform multiple parallel processing tasks that enable the complete end-of-day processing execution for all entity system(s) 104. In some examples, automatic process executor 314 may be optimized in the case of a multi-tenant deployment platform to be executed rather quickly (e.g., 20 to 30 minutes), including with entity system(s) 104 managing large transaction volumes with more than 80,000 new account transactions per day.

In some examples, automatic process executor 314 may transmit one or more processing action(s) 124 for downstream (internal or external) processing by one or more of entity system(s) 104, in response to the daily/end-of-day processing operations. For example, CPM server(s) 102 may generate and provide one or more data feeds to entity system(s) 102 for sending processing action(s) 124 and/or may transmit one or more files including processing action(s) 124 to entity system(s) 104 for downstream processing. Non-limiting examples of downstream processing by entity system(s) 104 (that may be triggered by processing action(s) 124) may include taxation reporting, account statement generation, automated clearing house (ACH) settlements and data handed off to an internal MIS analytics system of entity system(s) 104.

It may be appreciated that technical support of daily/end-of-day processing tasks and activities would typically require a user to have a deep understanding of the database structure and log content, as well as a deep understanding of the structure of the end of day processing concepts. Additionally, the ability to query these details requires database access rights, something which is generally heavily restricted and only allowed for authorized database administrators. In some examples, CPM server(s) 102 may include an administrator GUI (not shown) to facilitate the automated monitoring of the daily/end-of-day processing in a user-friendly manner. The administrator GUI may be configured with specific functionality that allows administrators to view real-time details of the processing status and the most relevant information related to all end of day processing operations performed by automatic process executor 314. With this functionality, users can easily and rapidly hone-in on a specific process execution and status without having to search for the same type of information in a generic, global log that would be time consuming, resource consuming and difficult to navigate, requiring in-depth technical knowledge of the application and database concepts. Accordingly, in some examples, in addition to the completely automated execution of all daily processing requirements, the CPM server(s) 102 may also provide automated monitoring tools through an Administrator GUI as well as automated notifications of current processing statuses. Additional information regarding aspects of an Administrator GUI according to the present disclosure may be found below, with reference to FIGS. 8A-8G.

Report manager 316 may be configured to generate one or more reports regarding the lifecycle processing of user-customized product(s) 122. The report(s) may be transmitted to one or more of entity system(s) 104, one or more of user device(s) 106 and/or any other remote system(s). For example, the reports may include regulatory reports, government entity reports (e.g., tax reports), MIS reports (including intelligence reports), product reports (e.g., updates on user-customized product(s) 122), account statements and/or any suitable information associated with user-customized product(s) 122 and/or user accounts. In general, report manager 316 may generate one or more reports associated with lifecycle processing operations and/or events of user-customized product(s) 122 over the respective lifecycle. In some examples, report manager 316 may be configured to provide automated notifications of current processing statuses of user-customized product(s) 122.

Real-time tracker 318 may be configured to perform real-time tracking of one or more data sources that may be relevant to user-customized product(s) 122 and/or daily/end-of-day processing operations (of automatic process executor 314). In one non-limiting example, real-time tracker 318 may include automated monitoring tools that monitor live electronic marketplace activity in real-time (e.g., commercial activity, treasury and hedge management positions, interest rate volatility, live market data, etc.). The results of real-time tracking may be provided to one or more of components 302, 308, 310, 312, 314 and 316 for incorporating the tracking results into the lifecycle operations and/or daily/end-of-day processing operations of automated lifecycle processing system 118.

In a non-limiting example, CPM server(s) 102 may be configured to generate customized products (e.g., liquid time deposits) associated with one or more entity system(s) 104. A conundrum faced by the CPM server(s) is that users wish to achieve the highest return on their product(s) while committing their funds for the shortest possible time (i.e., short term products), while entity systems providing such product(s) prefer longer term product(s) that provide further stability. CPM server(s) 102 solve this problem by providing the ability to create user-customized product(s) 122 with both the option to contract with longer term products (e.g., certificates of deposit (CDs)), while at the same time providing automatic regular liquidity, or an ad-hoc liquidity calendar schedule. In this manner, both the short term liquidity needs of users and the long-term stability of entity systems are addressed. To be clear, this combination of seemingly mutually exclusive characteristics are only possible through the unique customization capacity provided by the system of the present disclosure.

To achieve such customizability, CPM server(s) 102 may generate dynamic offering GUI 116 (or 200) on CPM website 114. GUI 116 (200) may include a dynamic screen that allows users to define their preferred liquidity amount and frequency or ad-hoc calendar. Based on the user inputs (and on real-time market data), dynamic offering GUI 116 (200) may dynamically reprice the product. This type of offering can be further configured by a particular entity system (e.g., entity system 104-1) to apply rates that are below standard deposit rates of the particular entity system, as an offset to the liquidity feature, thereby achieving a reduction in funding cost if desired.

Once the account is opened (e.g., by automated lifecycle processing system 118), automated lifecycle processing system 118 may automatically manage all lifecycle processing of the potentially infinite combinations of user-personalized accounts (with user-customized product(s) 122), with no incremental operational overhead for the particular financial entity system.

CPM server(s) 102 of the present disclosure enables users to customize products that optimize the yield on their investments without surrendering the liquidity on their funds, a combination of features that does not exist outside of the present disclosure. Further, the CPM server(s) 102 of the present disclosure generate operational efficiencies that provide clear technical benefits (as well as economic benefits, in some examples) for both entity system(s) 104 as well as user device(s) 106, as discussed herein.

In some examples, components 108-118 of CPM server(s) 102 may be embodied on a single computing device. In other examples, components 108-118 of CPM server(s) 102 may be embodied on two or more computing devices distributed over several physical locations, connected by one or more wired and/or wireless links. It should be understood that CPM server(s) 102 refers to a computing system having sufficient processing and memory capabilities to perform the specialized functions described herein.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network.

For example, a system according to the present disclosure includes an ordered combination of specialized computer components (e.g., middleware engine, security management system, centralized database structure(s), CPM website, dynamic offering GUI, etc.) that, collectively, monitor multiple entity systems, receiving/retrieve real-time data (e.g., from feeds) having varying data formats and originating from any number of external systems, providing security protection and encryption of sensitive data, storing the received data in a secure manner in at least one centralized database structure, providing a specialized interactive GUI that creates user-customized products (including from baseline products from among received data and that dynamically adjusts and displays (in real-time) product parameters (and impact of such adjustments) without having to reprogram system, and managing lifecycle events and processing actions for the customized products by interacting with one or more external systems and initiating one or more automated actions. As a result, the CPM server obtains the most up-to-date information, provides an interactive customizable-product user interface including the ability to dynamically customize products and creates a dynamic representation of the effects of user selection(s)/adjustment(s) to the products in real-time (based on the most-up-to-date information), creates user-customized products in a manner that does not reconfigure key (baseline) product components, and manages processing of the customized products; thereby providing an improved user interface, providing user-customizable products without increasing the computational burden on the entity systems that create and process customized products, and improving the accuracy of the product offerings to users through the interactive user interface.

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented as data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 4:
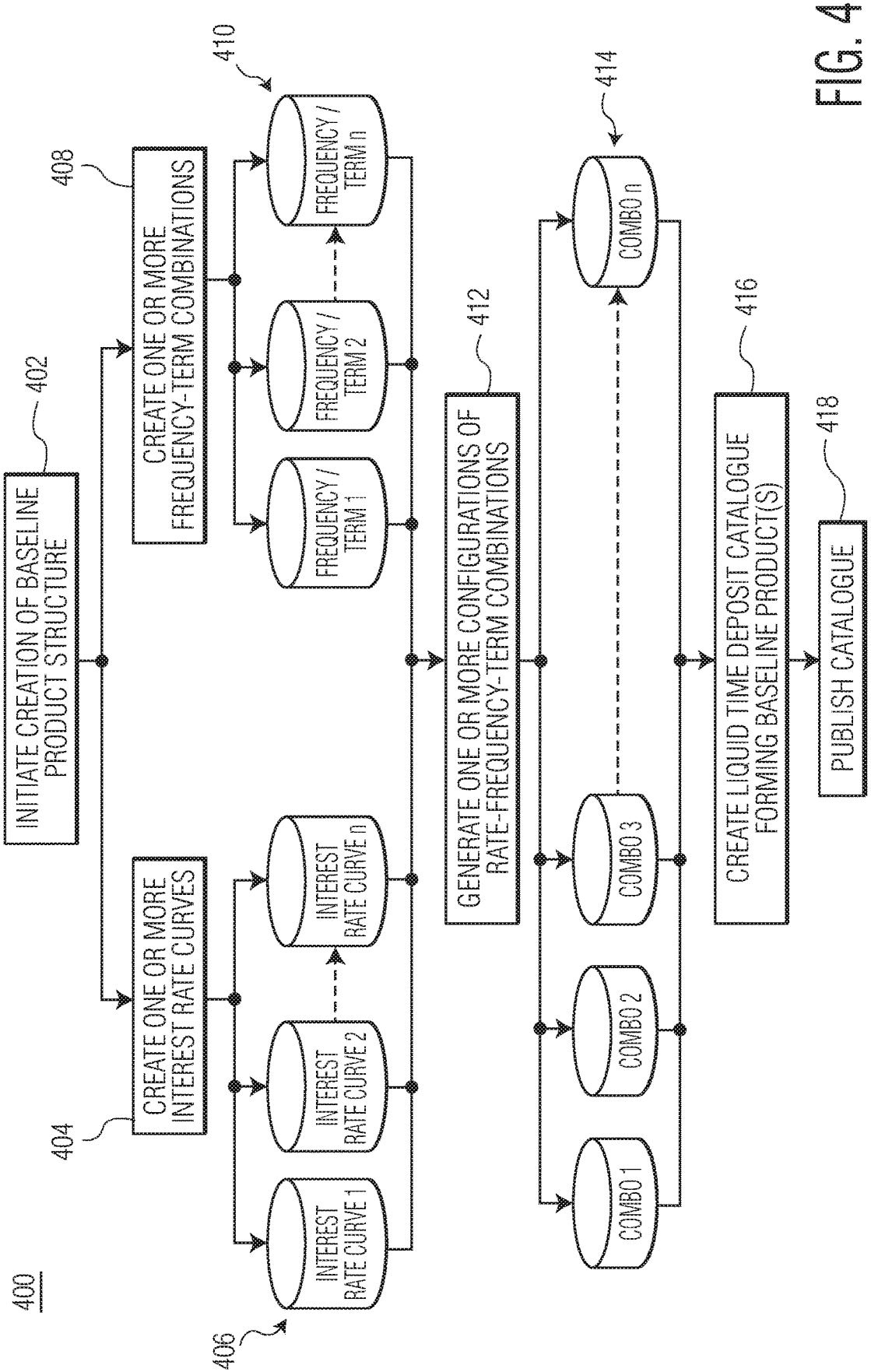
FIG. 4 is a flowchart diagram of an example method for creating baseline products, according to an aspect of the present disclosure.

Referring next to FIG. 4, a flowchart diagram is shown of an example method 400 for creating baseline product(s) 120 by at least one of entity system(s) 104 (e.g., entity system 104-1), according to an aspect of the present disclosure. It is understood that method 400 represents a non-limiting example of generating baseline product(s) 120 comprising a set of time deposit products. This method 400 may be implemented to create any other type of product anticipated by the present disclosure.

At step 402, at least one of entity system(s) 104 (e.g. a financial institution, a bank, a credit union, etc.) and/or customized product management server 102 may initiate creation of one or more baseline financial products having a baseline product structure. At step 404, live and/or historic rate pricing data may be obtained (e.g., from external system(s)) to create one or more interest rate curves 406. At step 408 (which may be performed, in some examples, simultaneous with step 404), one or more one or more combinations 410 of tenor and frequency may be created. Combinations 410 may later be used by CPM server(s) 102 to construct user-customizable liquidity term deposit products.

Once baseline parameters (curves 406 and combinations 410) have been configured, steps 404 and 408 may proceed to step 412. At step 412, one or more configurations 414 of rate-frequency-term combinations of all the underlying parameter sets may be generated. In other words, configurations of underlying rate curves 406 and the underlying tenor and frequency parameters (combinations 410) may be generated, thereby resulting in one or more configurations 414 having combinations of rate, tenor and frequency.

At step 416, at least one product catalog may be created that includes baseline product(s) 120. At step 418, the catalog(s) may be published (e.g., electronically distributed) and made available (e.g., to CPM server(s) 102). In some examples, the catalog may be received by CPM server(s) 102 via a real-time data feed interface.

Table 1 below illustrates a simplified example of baseline products that may be provided.

TABLE 1

| Term | Rate | Frequency/Term Combinations | | | | |
|---|---|---|---|---|---|---|
| | | Monthly | Bi-Monthly | Quarterly | Bi-Annual | Annual |
| 1 month | 0.30% | No | No | No | No | No |
| 2 month | 0.35% | Yes | No | No | No | No |
| 3 month | 0.45% | Yes | No | No | No | No |
| 6 month | 0.70% | Yes | Yes | Yes | No | No |
| 12 month | 0.90% | Yes | Yes | Yes | Yes | No |
| 18 month | 1.30% | Yes | Yes | Yes | Yes | No |
| 24 month | 1.70% | Yes | Yes | Yes | Yes | Yes |
| 36 month | 1.80% | Yes | Yes | Yes | Yes | Yes |
| 48 month | 1.95% | Yes | Yes | Yes | Yes | Yes |
| 60 month | 2.10% | Yes | Yes | Yes | Yes | Yes |

Figure 5:
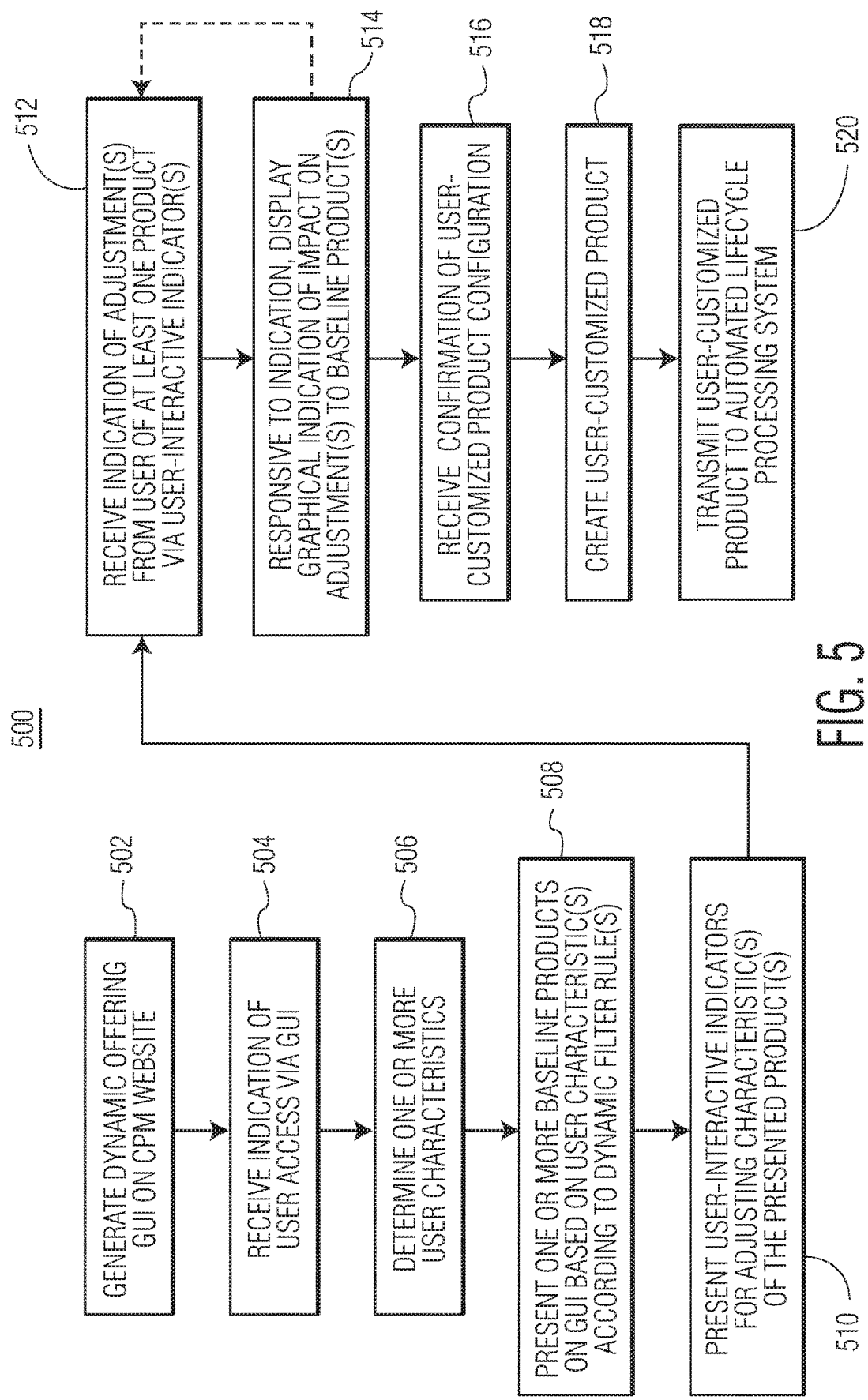
FIG. 5 is a flowchart diagram of an example method for creating user-customized products via an interactive GUI, according to an aspect of the present disclosure.

CPM server 102 may be configured with more or less modules to conduct the methods described herein with reference to FIGS. 5 and 6. In particular, FIG. 5 is a flow chart diagram illustrating an example method for creating user-customized products via dynamic offering GUI 116, according to an aspect of the present disclosure; and FIG. 6 is a flow chart diagram illustrating an example method for managing a lifecycle of a user-customized product, according to an aspect of the present disclosure. As illustrated in FIGS. 5 and 6, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 5 and 6 may be performed by one or more specialized processing components associated with components 108-118 of data structure management system 100 of FIG. 1.

Referring now to FIG. 5, a flowchart diagram is shown of an example method 500 for creating user-customized product(s) 122 via dynamic offering GUI 116 (or 200), according to an aspect of the present disclosure. At step 502, dynamic offering GUI 116 (200) may be generated on CPM website 114 for creating user-customized product(s) and may be accessed via user device(s) 106. Initially, dynamic offering GUI 116 (200) may be configured to display baseline product(s) 120 with one or more indicators of product customizability (e.g., for adjusting parameter(s) of baseline product(s) 120).

At step 504, dynamic offering GUI 116 (200) may receive an indication of user access to CPM website 114 via user device(s) 106. At step 506, dynamic offering GUI 116 (200) may determine one or more user characteristics of the user accessing CPM website 114.

At step 508, dynamic offering filter(s) 204 may apply one or more dynamic filter rules based on the user characteristic(s), and dynamic offering GUI 116 (200) may present one or more of baseline product(s) 120 on user device(s) 106 according to the dynamic filter rule(s). In some examples, the selection of baseline product(s) 120 presented on user device(s) 106 may be restricted by entity system(s) 104 on the basis of dynamic filter rule(s) introduced into CPM server(s) 102 by entity system(s) 104. In one example, a particular entity system (e.g., entity system 104-1) may provide filtering rules to filter the same product with different baseline rate curves dependent on the user's (or user device's) geolocation. In another example, entity system 104-1 may provide filtering rules to present the same product with different baseline rate curves and tenors dependent on the user's existing relationship with entity system 104-1, or dependent on any other of the user's characteristics (e.g., wealth categorization, industry, etc.).

At step 512, dynamic offering GUI 116 (200) may receive input triggering one or more adjustments to parameters of baseline product(s) 120 via one or more user-interactive indicators (generated by dynamic offering GUI 116 or 200). The input may take the form of text, selection(s) from a drop-down menu, click(s) on selection buttons, drag-and-drop data into a box or dedicated screen area, or any other form of data input.

At step 514, dynamic offering GUI 116 (200), responsive to the indication(s) input, may generate and dynamically display, in real-time, a graphical indication and/or a textual indication of an impact of the adjustment(s) to other parameters and/or characteristics of baseline product(s) 120. In some examples, steps 512 and 514 may be repeated one or more times. In this manner, dynamic offering GUI 116 (200) provides the ability to input multiple adjustments in order to customize baseline products(s) 120 together with the ability to display, in real-time, the impact to the baseline product characteristics. Thus, by using the interactive means provided by dynamic offering GUI 116 (200), the user input (whether from user device 106 and/or entity system(s) 104) may be used to fully customize the baseline product(s) by adjusting any number of parameters/characteristics of said baseline product(s). In some examples, the adjustment(s) to the parameters/characteristics may include introducing details of one or more liquidity events (e.g., including details of an amount desired, a date desired and/or frequency of the event(s) and/or a narrative description of the liquidity need). In some examples, as this interactive configuration and adjustment is undertaken, user device(s) 106 and/or entity system(s) 104 may display a graphical illustration of the impact of the adjustments on baseline product(s) 120 (e.g., a liquidity time deposit), as said adjustments are being applied (i.e., a dynamic illustration).

At step 516, dynamic offering GUI 116 (200) may receive a confirmation indicating completion of the user-customized product configuration. In this manner, once the user has made all desired adjustments and configurations to baseline product(s), dynamic offering GUI 116 (200), via user device(s) 106 and/or entity system(s) 104, may confirm the user selections.

At step 518, dynamic offering GUI 116 (200) may create user-customized product(s) 122 (based on the confirmation in step 516). In a non-limiting example, responsive to the confirmation, dynamic offering GUI 116 (200) may automatically issue the user-customized product. In a non-limiting example, issuance of the user-customized product may include issuance of a liquidity time deposit/contract.

At step 520, dynamic offering GUI 116 (200) may transmit user-customized product(s) 122 to automated lifecycle processing system 118.

In some examples, as each user-customized product is issued, automated lifecycle processing system 118 may automatically inform the associated entity system(s) 104 by registering and handling the contract in accordance with lifecycle processing operations. The operations may include automated funding of the contract (e.g., via accounting engine 310 and/or via communications with one or more external systems) and automated scheduling and execution of all downstream processing for the contract and any user defined liquidity events. In this respect, entity system(s) 104 may keep a running tally of the total volume of contracts, as well as a running tally of total volumes with a breakdown of volume by tenor and liquidity event calendars. Moreover, entity system(s) 104 may elect to interactively adjust the interest rate curve(s) 406 and/or the offered frequency/tenor combinations 410 in order to control the volume of deposits for specific tenors, or all tenors, as determined by the funding and asset and liability management needs of entity system(s) 104. Any such change, once it is approved and published by entity system(s) 104, may have an immediate effect on the product catalogue and the variety of baseline product structures that may be presented to users via dynamic offering GUI 116 (200).

Referring next to FIG. 6, a flowchart diagram is shown of an example method 600 for managing a lifecycle of one or more user-customized product(s) 122, according to an aspect of the present disclosure. FIG. 6 illustrates automated downstream management of one or more user-customized product(s) 122 comprising user-customized product (e.g., a customized liquidity time deposit(s)) throughout a product/contract lifecycle, for example, by automated lifecycle processing system 118. In some examples, the automated lifecycle processing method 600 shown in FIG. 6 may be conducted following the issuance of one or more user-customized products. Although FIG. 6 illustrates the management of an exemplary product, method 600 is not limited to this example, and may be used to manage any suitable user-customized product in accordance with the description herein.

At step 602, automated lifecycle processing system 118 (e.g., task controller 302) may receive one or more user-customized products (e.g., user-customized product(s) 122 from dynamic offering GUI 116 or 200). For example, when the customized product(s) include user-customized liquidity time deposit(s), each product may include unique characteristics such as deposit notional, tenor, liquidity events, liquidity amounts, APY and/or interest amount. Automated lifecycle processing system 118 (e.g., a single automated system) may be configured to manage the processing of all of the (user-customized) liquid time deposit products.

At step 604, automated lifecycle processing system 118 (e.g., accounting engine 310) may perform automated funding operations and formalization of characteristics operations of the user-customized products. For example, automated lifecycle processing system 118 may read in the characteristics of each user-specific product. The characteristics may be analyzed and interpreted, and the system may automatically generate instructions (which may be transmitted to one or more external systems or processed internally) that initiate the collection of funds for the formalization of a user contract. The instructions for collection of funds may be created for a single location (e.g. for a single entity system such as entity system 104-1), or across multiple locations or entity systems 104. Accordingly, for each user-specific product (e.g., liquidity time deposit product), automated lifecycle processing system 118 may classify the deposit, may generate appropriate accounting entries, and may aggregate data through one or more processes that allows entity system(s) 104 to satisfy any regulatory and fiscal reporting requirements, as well as store data for any analytical reporting.

Following the funding and formalization (step 604) of one or more user-customized product(s), at step 606, automated lifecycle processing system 118 (e.g., event scheduler 308) may perform automated scheduling of one or more user-specific/contract-specific liquidity events. Automated lifecycle processing system 118 may read in the characteristics of each user-specific liquidity time deposit, and may analyze and interpret the characteristics to automatically generate instructions (which may be transmitted to one or more external systems or processed internally) for scheduling planned liquidity events. In some examples, the instructions may including details of the user/contract specific dates, amounts, liquidity transaction descriptions and/or desired settlement or payment account. Thus, automated lifecycle processing system 118, at step 606, may generate details of the scheduled liquidity events of each deposit product, and may store the scheduled events for each product. Automated lifecycle processing system 118 may then be configured to manage the scheduled liquidity event(s) (e.g., from the issue date of the user-customized product through to the maturity date of the same product).

At step 608, automated lifecycle processing system 118 (e.g. settlement engine 312) may automatically generate one or more product settlements. For example, automated processing system 118 may read data associated with a liquidity product (e.g., liquidity event data, calendar schedule, APY, interest and deposit amounts and/or liquidity transaction descriptions). Automated lifecycle processing system 118 may analyze and interpret the data to automatically generate instructions (which may be transmitted to one or more external systems or processed internally) for the settlement of funds for the user contract liquidity event(s). In some examples, for each user-specific liquidity time deposit, automated lifecycle processing system 118 may reclassify the deposit, may generate appropriate accounting entries, may generate payment instructions for one or more of entity system(s) 104, may store data for analytical reporting and may aggregate data in a manner that allows entity system(s) 104 to satisfy any regulatory and/or fiscal reporting requirements.

At step 610, automated lifecycle processing system 118 (e.g., automatic process executor 314) may perform a daily/end-of-day processing of liquidity products (as discussed above) and may generate one or more processing action(s) 124 for downstream processing by one or more of entity system(s) 104. At step 612, CPM server(s) 102 may transmit the processing action(s) to corresponding ones of entity system(s) 104, for example.

Referring next to FIGS. 7A-7G, example screenshots of dynamic offering GUI 700 are shown. Each of FIGS. 7A-7G illustrates an example of interactive windows (within dynamic offering GUI 700) configured to receive input for creating user-customized products. In some examples, dynamic offering GUI 700 may be generated via CPM website 114. Dynamic offering GUI 700 is an example of an interactive GUI that may comprise one or more windows and/or regions configured to display data associated with one or more baseline products, input tools that adjust parameters and characteristics of baseline product(s) in response to input, dedicated fields that receive textual information, graphical and/or textual indicators that dynamically illustrate the impact of any user adjustments on other product parameters and characteristics (i.e., in real-time in response to user adjustments), and one or more selector buttons the guide users in the customization and finalization of product(s). Information displayed on dynamic offering GUI 700 may be updated, for example, in real-time, in near real-time, periodically (for example, on a daily basis, on an intraday basis, etc.), based on one or more predetermined schedules, events, etc. In some examples, information displayed on dynamic offering GUI 700 may be updated based on data/information received from entity system(s) 104 via one or more real-time data feed interfaces.

Figure 7A:
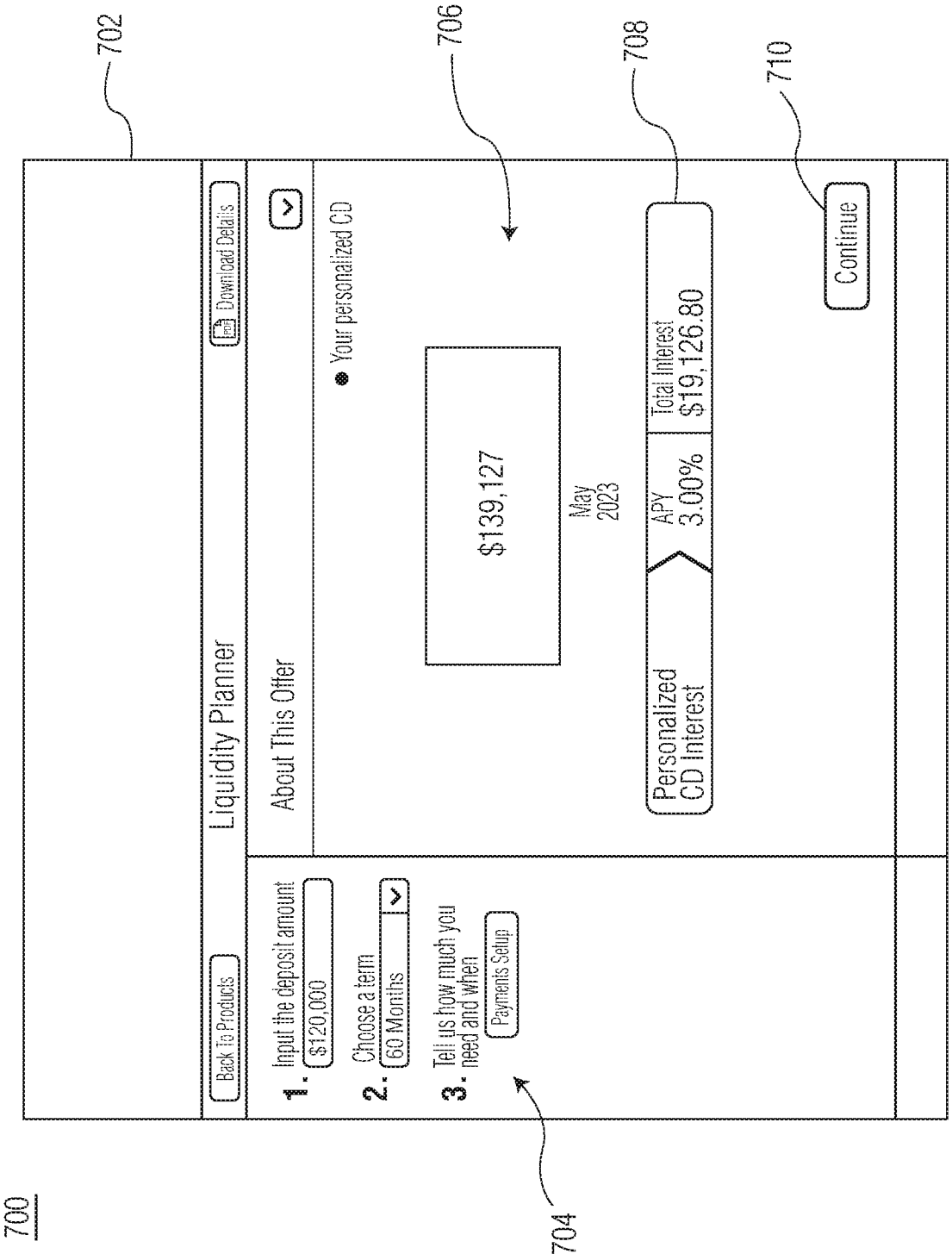

FIG. 7A illustrates an initial screen 702 of dynamic offering GUI 700. Screen 702 may include selection region 704. Selection region 704 may allow a user to input an amount to deposit (e.g., via textual input) and choose a term (e.g., from a dropdown input tool). Screen 702 may also include a graphical display region 706 that displays payment details and a region 708 that displays a default CD rate and amount of interest that will be earned over the selected term. Screen 702 also includes a selector button 710 for setting up a series of pre-maturity payments. As data is entered into any of the input fields noted above, the graphical display region 706 and region 708 are automatically updated to reflect such input.

Figure 7B:
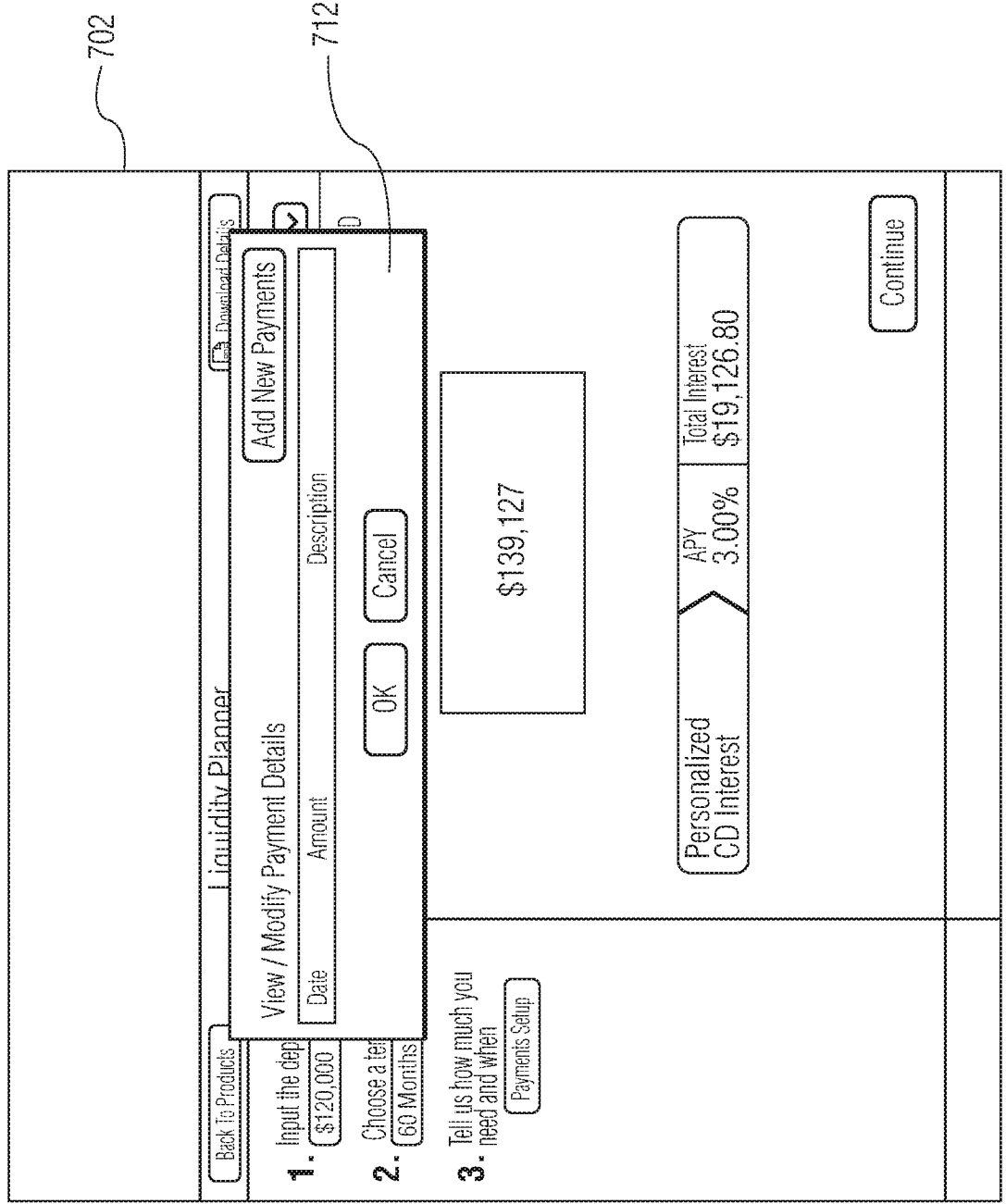

FIG. 7B illustrates pop-up window 712 which may be displayed (e.g., over initial screen 702) if the user selects selector button 710, and chooses to enter other customization parameters, such as setting up a pre-maturity payments. Pop-up window 712 may include user input tools that can be used to input payment information e.g., via "Add New Payments" button or similar input function.

FIG. 7C illustrates another pop-up window 714 that may be displayed responsive to a user customization input (e.g., selecting the "Add New Payments" or similar input function, presented in pop-up window 712 in FIG. B). Pop-up window 714 (which may be displayed over initial screen 702) may include user input tools 716 including for receiving input comprising selections of one or more dates, payment amount, and a text description (e.g., as a useful reminder of each scheduled payment/withdrawal). Pop-up window 714 may also include an "Add" or similar selector 718 for recording user-created payment entry.

Figure 7D:
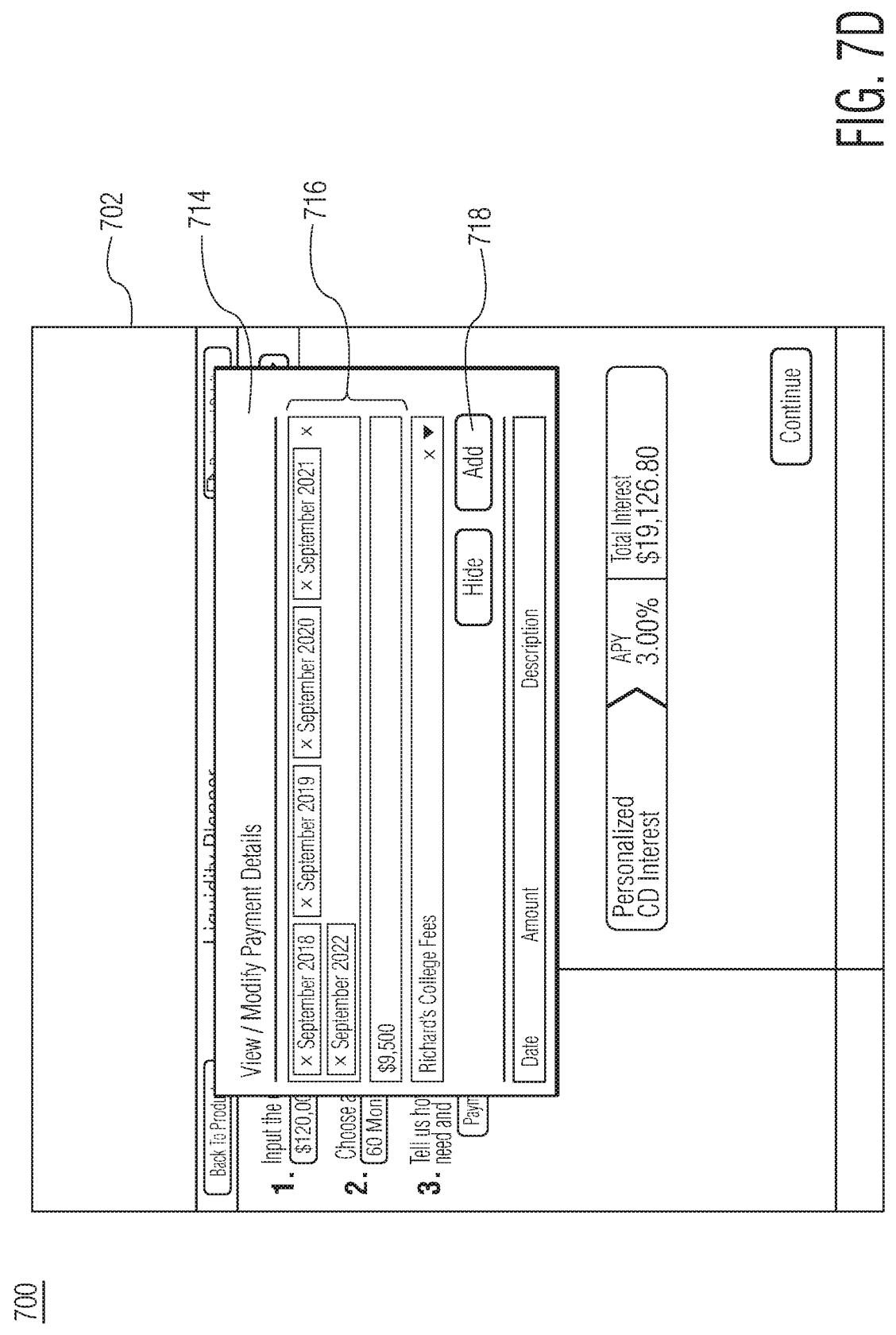

FIG. 7D illustrates pop-up window 714 in an example where the user has chosen to setup five payments (each September), with each payment being for a regular amount of $9,500, together with the text description "Richard's College Fees." Clicking on "Add" or similar selector 718 may be used to record the example planned transactions. It should also be understood that the pop-up window 714 may accommodate any number of payment options, for any amount, and include any type or length of description (text or otherwise).

Figure 7E:
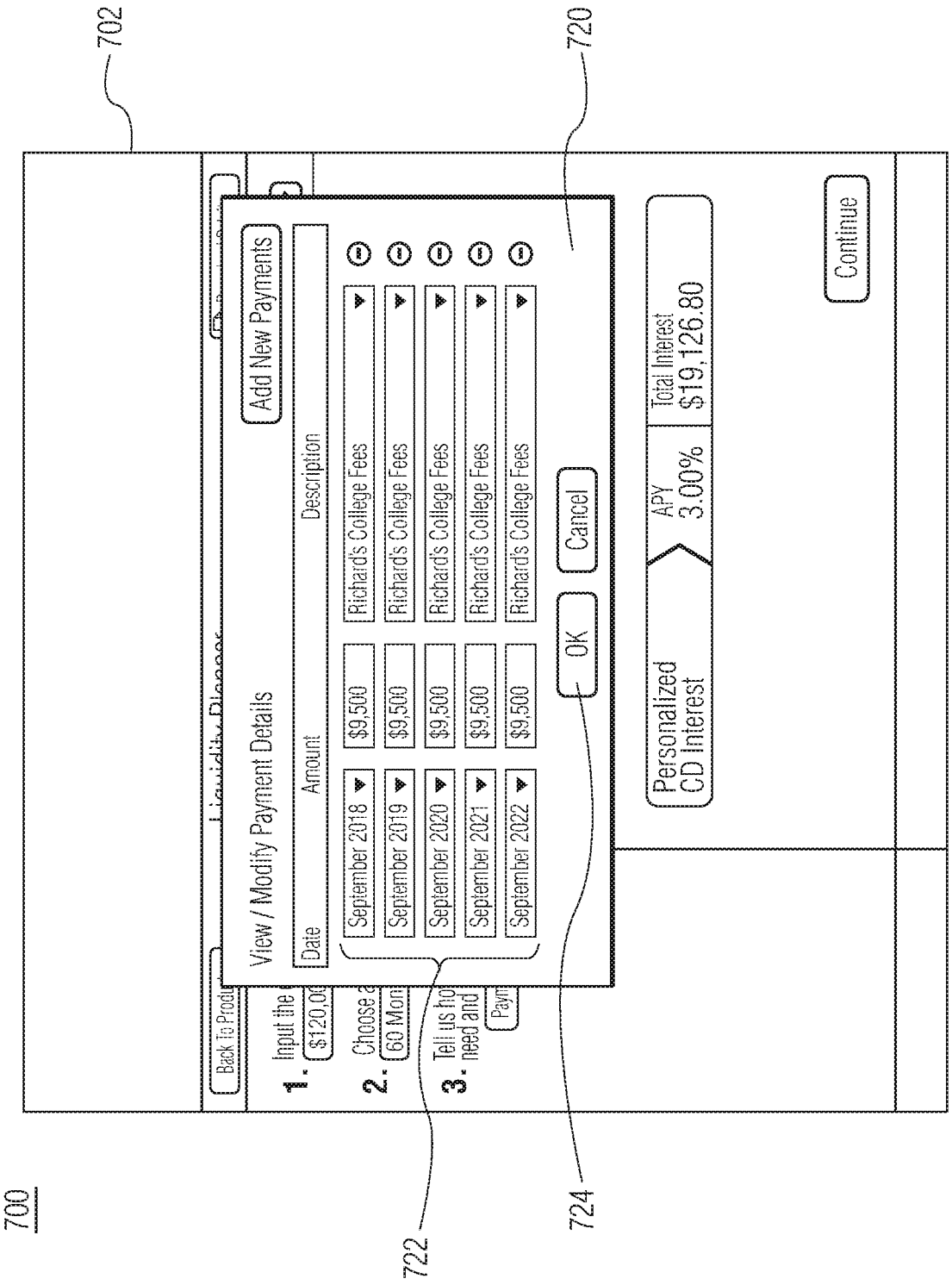

FIG. 7E illustrates pop-up window 720 (which may be displayed over initial screen 702). Pop-up window 720 may be displayed responsive to a user clicking "Add" or similar selector 718 in pop-up window 714 (FIG. 7D). Pop-up window 720 may include user input controls 722. User input controls 722 may include a list of currently scheduled payments, adjustment controls for individually adjusting the date, amount or description of each entry, and an option to eliminate any entry. Once complete, the user may clicks "OK" or similar button 724 to continue the product customization process.

Figure 7F:
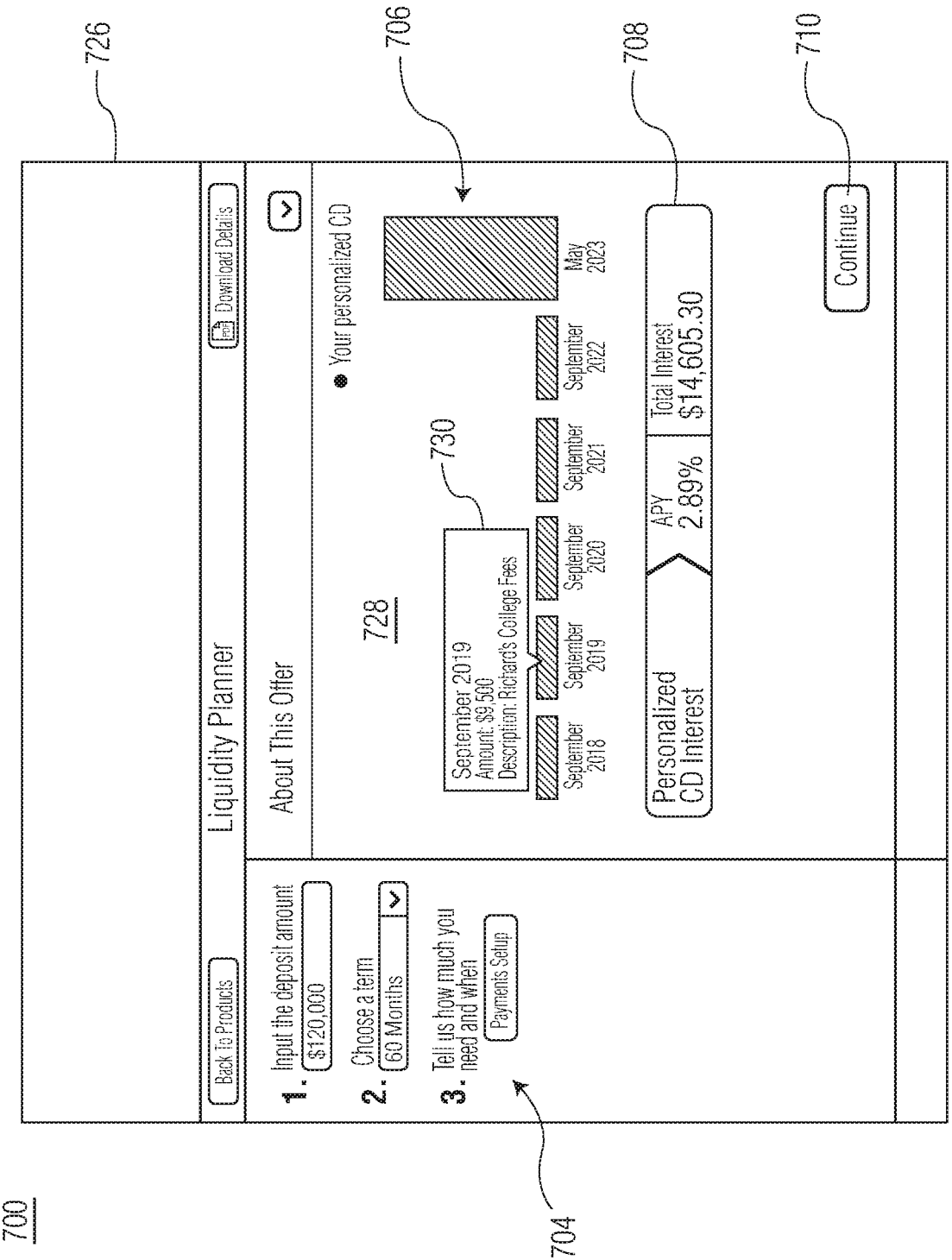

FIG. 7F illustrates screen 726 that may immediately and dynamically be generated responsive to selection or input of an "OK" button or similar function 724 in pop-up window 720 (FIG. 7E). Screen 726 includes regions similar to initial screen 702, but provides a graphical representation of the user-customized time deposit structure 728 in region 706. Region 708 may include a recalculated APY and new total interest amount for the term of the time deposit product. At the same time, the user can move a pointing device (e.g., a mouse) over the graphic 728 in region 706 to review details (e.g., details 730) of each scheduled payment.

Figure 7G:
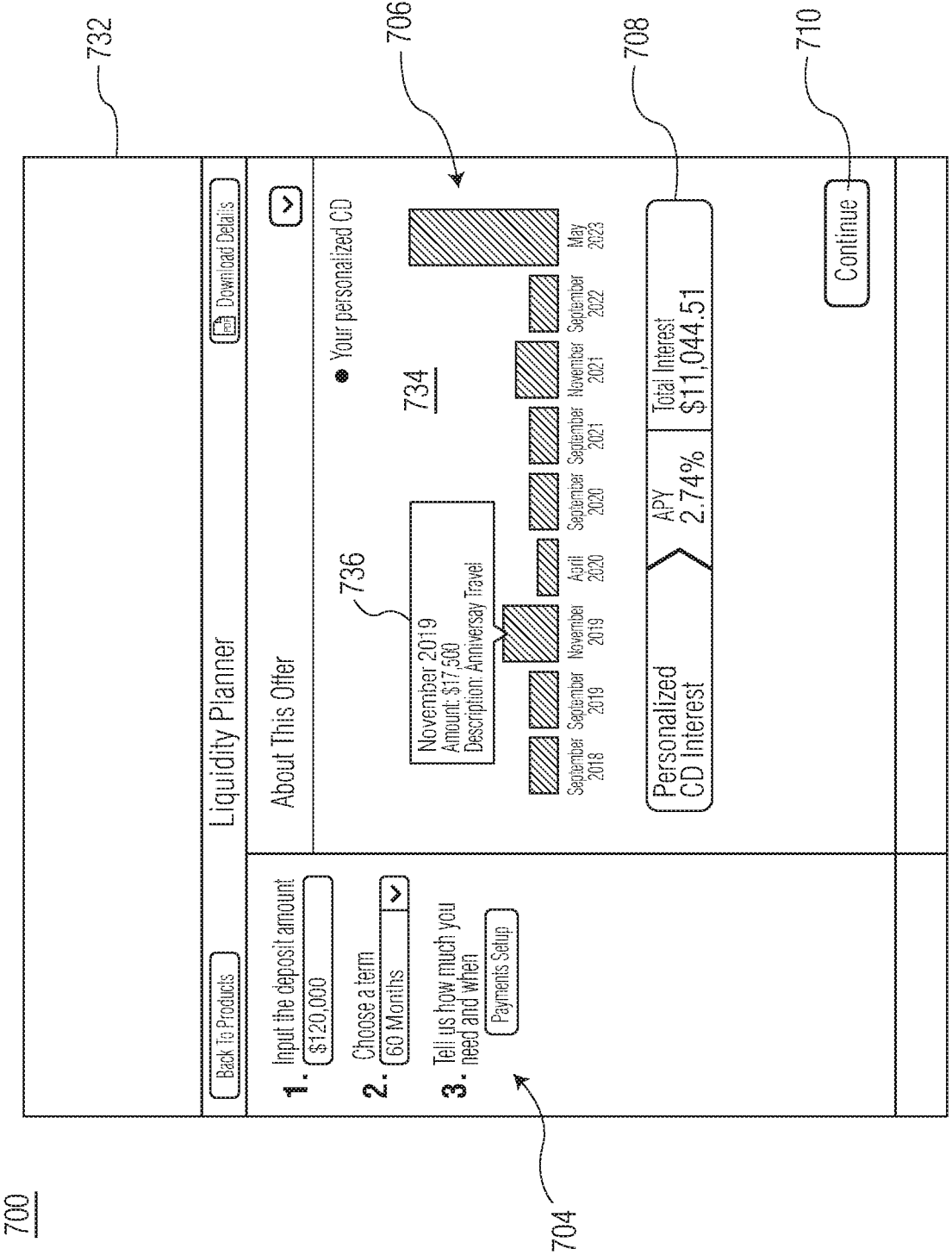

The user may use dynamic offering GUI 700 to set up additional pre-maturity payments by clicking the Payments Setup (or similar) button or function (in region 704) again. For example, FIG. 7G illustrates screen 732 that may be displayed responsive to the user introducing a series of additional entries. Regions 706 and 708 have been dynamically refreshed based on the user's unique personalized entries. Thus, region 706 now includes a graphic representation of customized time deposit product structure 734 with example details 736 being illustrated. In some examples, a user may finalize the user-customized product by selecting a "Continue" button or similar function 710.

Although exemplary sections/windows are depicted in FIGS. 7A-7G, alternative configurations for the sections/windows are envisioned. For examples, dynamic offering GUI 700 may contain more or fewer sections, windows, webpages and/or tabs. Additionally, the sections/windows may be reorganized in any manner and display any pertinent information.

In some examples, dynamic offering GUI 700 may be presented to any number and any types of users (e.g., account administrators via entity system(s) 104, personal investors of user devices 106, etc.) of the system. Dynamic offering GUI 700 may be configured with transparent and intuitive graphic tools with simple and easy to follow steps that may generate clear on-screen descriptions and simulations of the underlying product characteristics. Dynamic offering GUI 700 may also provide dynamic and personalized documentation. The result is an improved user interface device providing new and powerful functionality.

As discussed above, the systems and methodology of the present disclosure include technology that is absent and lacking in existing systems, including (without limit) capturing and storing user specific details of personalized product schedules (e.g., liquidity schedules) and calendars; automatic scheduling and executing of user-defined events at specific times (including via external systems); automatically recalculating product parameters (e.g., deposit APY based on a liquidity schedule and programmed amounts); accessing underlying rate tables and deriving present values of the user-customized products; dynamically presenting and updating the user-customized roduct information and parameters as its underlying parameters and/or external data change; functions that enable user-customization of product structures; automatically generating product specific documentation and reports; automatically reporting accounting and regulatory data; etc.

Referring next to FIGS. 8A-8G, example screenshots of administrator GUI 800 are shown. In some examples, administrator GUI 800 may be generated via automated lifecycle processing system 118. Administrator GUI 800 is an example of an interactive GUI that may comprise one or more windows and/or regions configured to display monitoring data and alerts associated with various processing tasks by CPM server(s) 102, and one or more selector buttons to guide administrators in the monitoring of processes. Information displayed on administrator GUI 800 may be updated, for example, in real-time, in near real-time, periodically (for example, on a daily basis, on an intraday basis, etc.), based on one or more predetermined schedules, events, etc.

FIG. 8A illustrates a principal monitoring screen 802 of administrator GUI 800. Screen 802 may include region 804 for selecting filter criteria such as data control buttons. Screen 802 may also include display region 806 for displaying status information on various tasks and datasets. The principal monitoring screen 802 may provide for easy navigation including date control buttons (e.g., in region 804) and the ability to display a high-level status (e.g., in display region 806) across multiple database instances, and the different tasks and data sets within each. As shown further in FIG. 8B, data in display region 806 may be selectable, such that selection of particular data may cause generation and/or display of additional information, such as in an additional region.

FIG. 8B illustrates screen 810 of administrator GUI 800. Screen 810 may include region 812 for displaying selectable data (similar to display region 806 in FIG. 8A). Screen 810 also illustrates additional detail region 814 that may be displayed responsive to selection of particular data in display region 812. In this manner, screen 810 may allow users to quickly drill-down on the details of any particular set of automated processing tasks to identify the granular status details of the underlying processing tasks.

FIG. 8C illustrates screen 820 of administrator GUI 800. Screen 820 includes display region 822 and detail region 824 which may display additional detail when particular data is selected in display region 822. Screen 820 also illustrates that information in display region may display status error indications, such as indication 826. As in screen 810 (FIG. 8B), screen 820 may provide users with navigation ability that allows for rapid identification of the status of any identified incident (e.g., via indication 826).

Figure 8E:
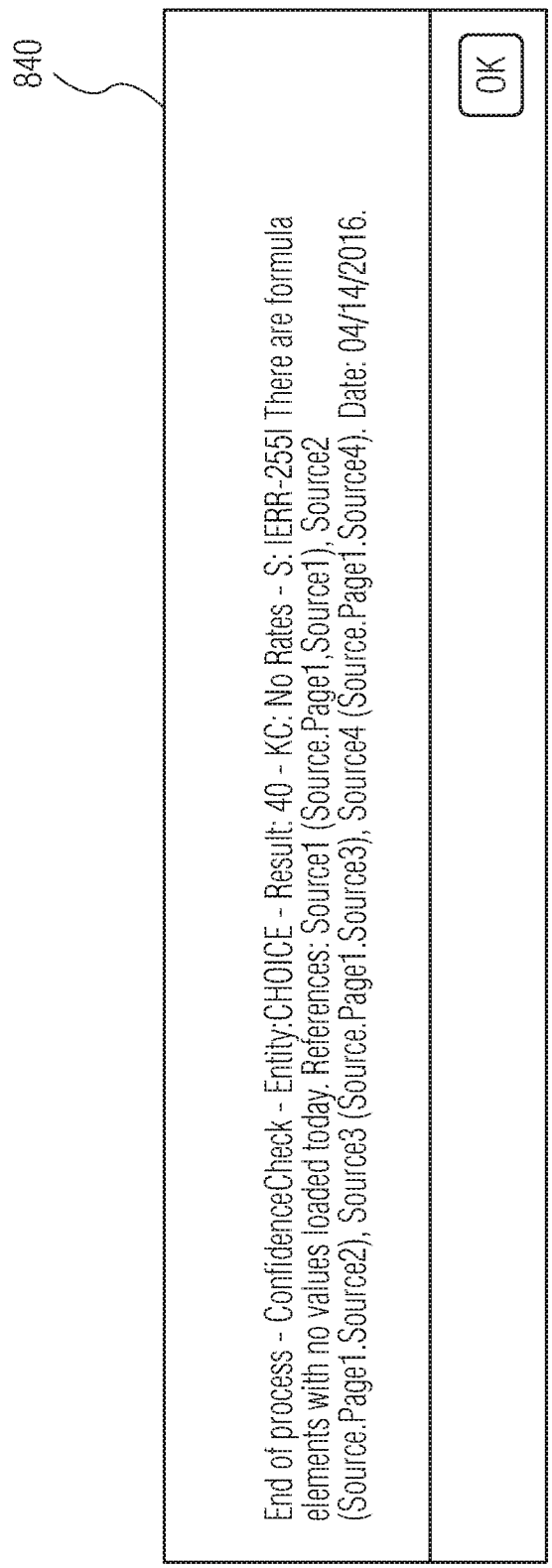

FIG. 8D illustrates screen 830 of administrator GUI 800. Screen 830 may include search region 832 for performing a search for a task. Screen 830 may also include display region 834 for displaying search results. Search region 832 may provide users with direct access the associated details of a task in question without requiring the user to have knowledge of the structure of the log entries. FIG. 8E illustrates additional information box 840 that may be displayed (e.g., on a separate window, in a pop-up window, as another region within screen 830, etc.) when the user selects button 846 in screen 830 (FIG. 8D) for a particular task in display region 834.

FIG. 8F illustrates screen 850 of administrator GUI 800. Screen 850 may include region 852 for general monitoring of the progress and status of scheduled tasks. Screen 850 may also include display region 854 for providing direct access to the details of all scheduled processes and their status.

FIG. 8G illustrates screen 860 of administrator GUI 800. Screen 860 is similar to screen 850 (FIG. 8F) except that display region 864 includes detail region 866. Detail region 866 may be displayed responsive to selection of particular data in display region 864. In this manner, screen 860 may provide users with the ability to immediately drill-down and access user-friendly details (e.g. in detail region 866).

Figure 9:
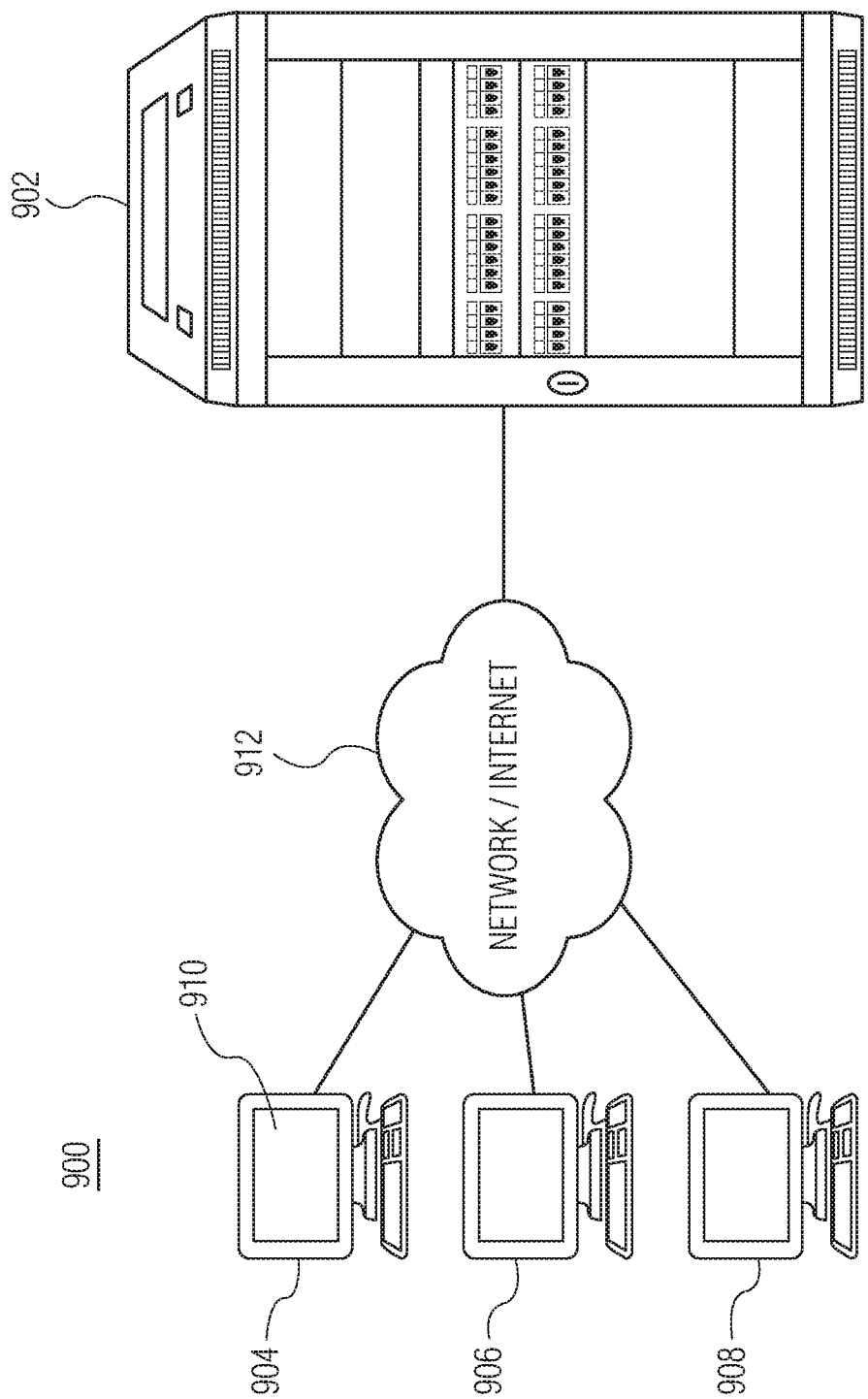
FIG. 9 is a functional block diagram illustrating an example data structure management system according to an aspect of the present disclosure.

Referring next to FIG. 9, an example data structure management system 900 is shown, according to an aspect of the present disclosure. In some examples, system 900 may be configured to create and manage user-customized product structures. System 900 may include one or more computing devices 902-908 in communication with each other, via, for example, wired or wireless communications network 912. Although not shown in FIG. 9, each computing device 902-908 may include memory for storing instructions, at least one processor for executing instructions and at least one communication component (e.g., for sending and receiving data/information). In some examples, computing devices 902-908 may communicate and interact as peers, such as in a peer-to-peer network, In some examples, computing devices 902-908 may communicate in a client-server relationship. For example, one of the computing devices (e.g., computing device 902) may operate as a centralized server that may provide data, program functions, security, etc., to the remainder of the group of devices (e.g., computing devices 904-908) that may operate as clients. In either scenario, computing devices 902-908 may reside at a single physical location (e.g., at a centralized entity system), or across multiple, physically separated locations (e.g., across one or more entity systems 104 and/or one or more user locations).

At least one of computing devices 902-908 may comprise instructions that, when executed, causes system 900 (via one or more of computing devices 902-908) to create a plurality of user-customized product structures. Each product structure may begin as a baseline product, where the baseline product may include a combination of one or more key product components. The user-customized product structure may include at least one predefined event (e.g., a liquidity event). The baseline product forming the basis for each product structure may also include one or more customizable component parameters. The customizable component parameters, when adjusted, may define the structure and characteristic(s) of each product structure.

To create customized products, one or more of computing devices 902-908 may include instructions for creating one or more baseline financial products by combining one or more underlying product components. In one embodiment, at least one of computing devices 902-908 may be configured to create different baseline products, each comprising a different combination of underlying product components. Once at least one baseline product has been created, one or more of computing devices 902-908 may create one or more user-customized product structures by dynamically adjusting, in response to user-defined input, one or more customizable parameters of at least one of the baseline products, as discussed above.

In one embodiment, at least one computing device 902-908 may further include a display 910 and instructions for automatically calculating certain product characteristics (e.g., an adjusted APY interest rate, an interest amount, etc.). In some examples, calculation of the product characteristics may be dynamically adjusted on based on (without being limited to) at least one of product parameters (e.g., liquidity events, a desired date of each event, a monetary value of each event as introduced into the system by the user, etc.).

In such an embodiment, display 910 may be configured to dynamically display and dynamically update a graphical and/or numerical representation of certain product characteristics (e.g., scheduled liquidity events, adjusted APY, interest amount, etc.) that change as one or more parameters are adjusted via, for example, a user input device. In some examples, such a computing device 902-908 may be configured to automatically prepare and display a summary report reflecting one or more adjusted parameters associated with each user-customized product structure; receive user input confirming each of the adjusted parameters; and issue user-customized product structures in response to user input confirmations.

In one embodiment, each underlying baseline product component may include one or more component elements that may define the product behavior and may define the impact of user-customized inputs on the overall product characteristics (e.g., calculated yield, final tenor, etc.). Non-limiting examples of component elements may include (in some embodiments) a present value of money, interest rate factor, capital guarantee limits, periodic liquidity payment limits, sum of interest payment values, frequency, number of payments, etc. Non-limiting examples of baseline product-specific elements may include: tenor, base parameter, dynamic texts, return tables, return values, and others.

Optionally, one or more of computing devices 902-908 may comprise instructions for executing certain post-issue operations. In one embodiment, for example, at least one device among computing devices 902-908 may include instructions that when executed, cause system 900 to receive settlement details (in response to issuing one or more user transactions), and to assign a settlement amount, based on the settlement details, for at least one baseline product. In addition, the device (among computing devices 902-908) may be configured to aggregate the transactions and underlying characteristics (e.g., liquidity events and amounts) on a real-time basis in order to enable at least one of entity system(s) 104 to monitor aggregate volumes by a particular parameter such as tenor. Moreover, the entity system (e.g., entity system 104-1) may interactively adjust product characteristics such as interest rate curve(s) and/or the offered frequency/tenor combinations in order to control the volume of deposits for specific tenors, or all tenors, as determined by the entity system (e.g., entity system 104). Any such change, once it is approved and published, may have an immediate effect on the product catalogue and the variety of baseline product structures presented to users via computing device(s) 902-908.

Figure 10:
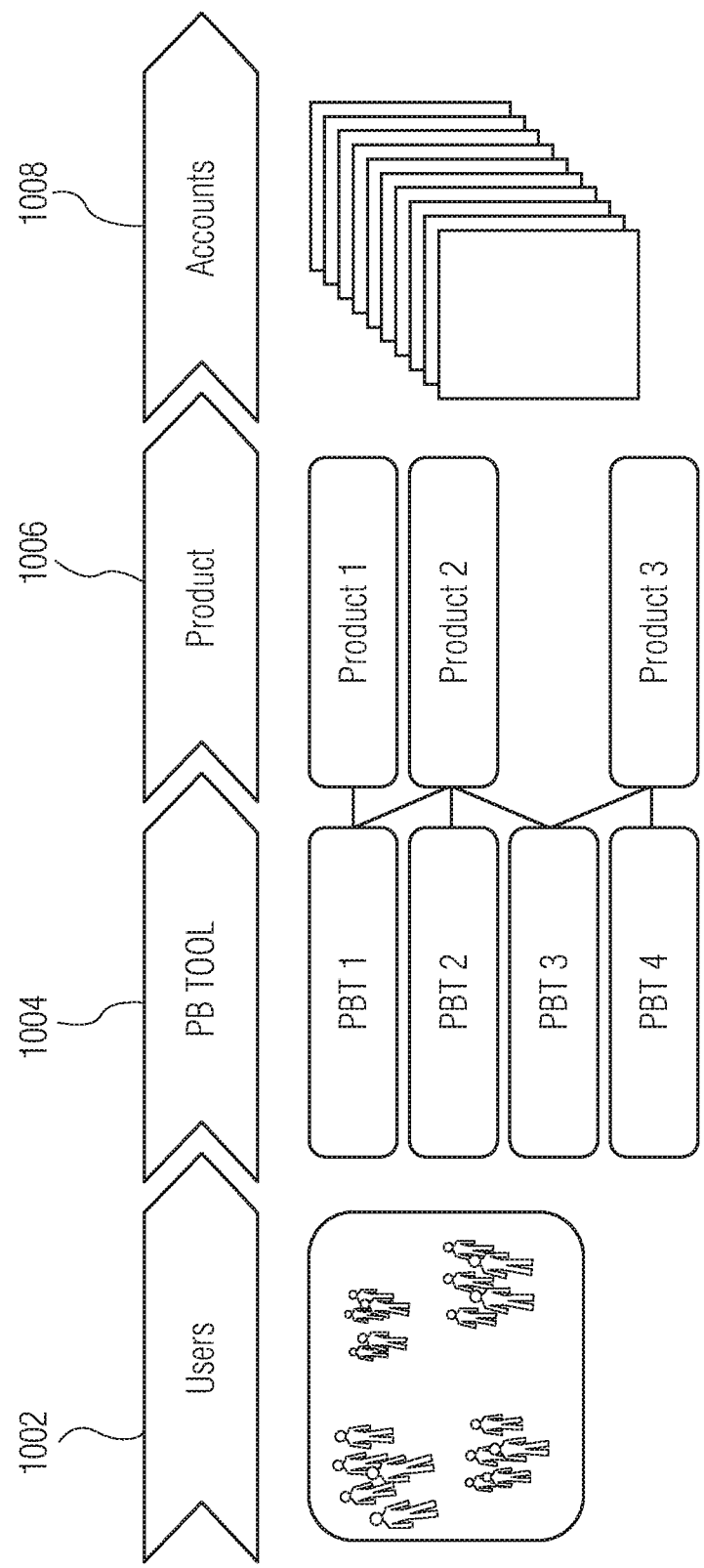
FIG. 10 is an example diagram illustrating a method of creating products using product builder tools according to an aspect of the present disclosure.

Referring next to FIG. 10, FIG. 10 is a diagram illustrating an example of creating products using multiple PB tool(s) 206. In FIG. 10, various users 1002 (e.g., clients) may access and customize baseline products through the use of PB tool(s) 1004. The resulting customized products 1006 may then be associated with personalization account(s) 1008 administered by entity system(s) 104 (e.g., a banking institution). This association of customized product(s) 1006 to personalization account(s) 1008 facilitates the entity system's 104 ability to manage the customized product(s) 1006 throughout their respective lifecycles. This is because, in one aspect, the association enables the entity system(s) 104 to relate any number of customized products 1006 back to their respective underlying baseline product (or baseline product catalogue), which in turn enables the entities 104 to process/manage the customized products 1006 similarly, without any incremental system processing overhead. In other words, customized products 1006 having a common underlying baseline product may be processed similarly, with little to no additional system processing overhead requirements. For example, customized Product 1 may result from customization of an underlying baseline product using PB tool (PBT) 1; customized Product 2 may result from customization of an underlying baseline product by using a combination of PBT 1, PBT 2 and PBT 3; and customized Product 3 may result from customization of an underlying baseline product by using a combination of PBT 3 and PBT 4. It is understood that FIG. 10 represents a non-limiting example for customizing underlying baseline products using PB tools 1004 (or PB tools 206).

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, an on-site computing device specially configured for a particular entity system 104, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with data structure management systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 11:
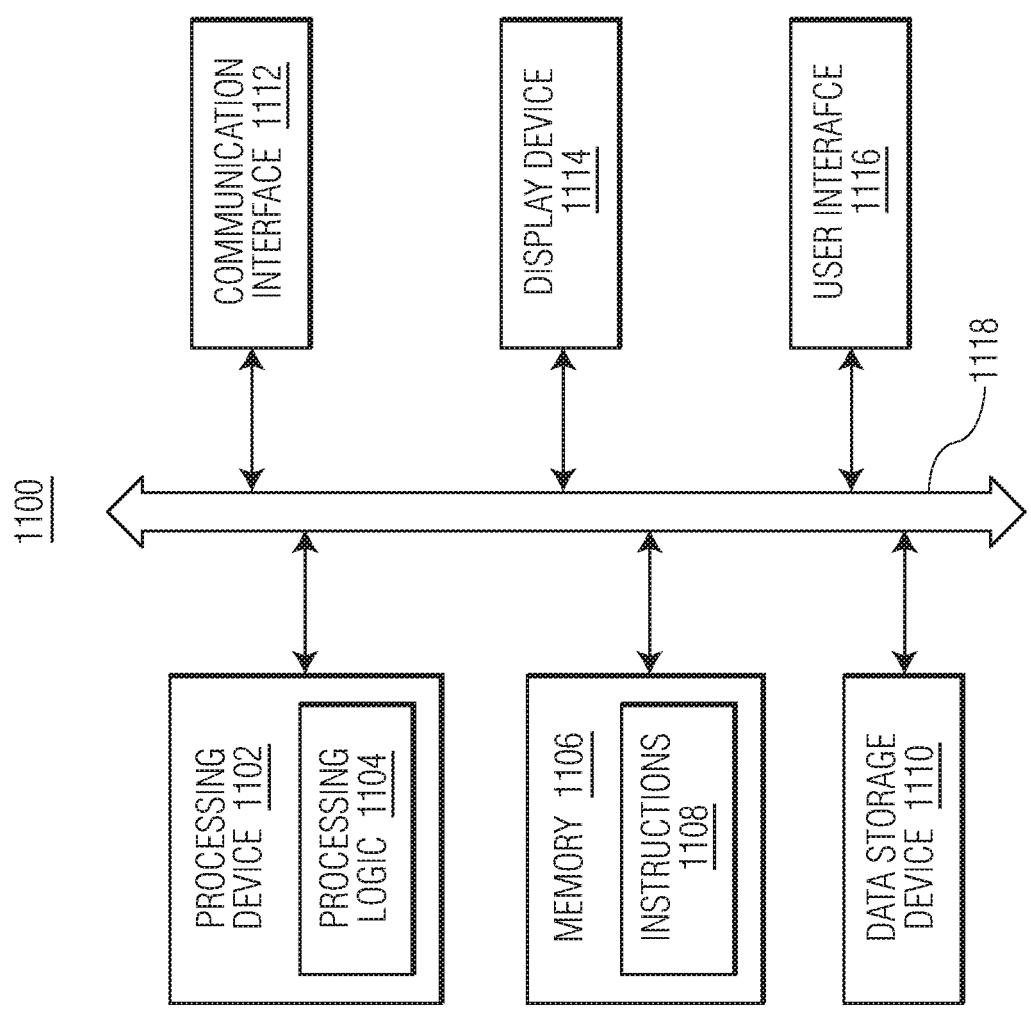
FIG. 11 is a functional block diagram of an example computer system according to an aspect of the present disclosure.

FIG. 11 illustrates a functional block diagram of a machine in the example form of computer system 1100 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of CPM server 102 (middleware engine 108, security management system 110, centralized database structure(s) 112, CPM website 114, dynamic offering GUI 116 and/or automated lifecycle processing system 118), entity system(s) 104 and/or user device(s) 106 may be implemented by a specialized machine, particularly programmed to perform certain functions, such as example machine shown in FIG. 11 (or a combination of two or more of such machines).

Example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Processing device 1102 may include, without being limited to, a microprocessor, a central processing unit, an application-specific integrated circuit (ASIC), a field programmable gate array (FPGA), a digital signal processor (DSP) and/or a network processor. Processing device 1102 may be configured to execute processing logic 1104 for performing the operations described herein. Processing device 1102 may include a special-purpose processing device specially programmed with processing logic 1104 to perform the operations described herein.

Memory 1106 may include, for example, without being limited to, at least one of a read-only memory (ROM), a random access memory (RAM), a flash memory, a dynamic RAM (DRAM) and a static RAM (SRAM), storing computer-readable instructions 1108 executable by processing device 1102. Memory 1106 may include a non-transitory computer readable storage medium storing computer-readable instructions 1108 executable by processing device 1102 for performing the operations described herein. For example, computer-readable instructions 1108 may include operations performed by components 108-118 of CPM server 102, including operations shown in FIGS. 5 and 6. Although one memory device 1106 is illustrated in FIG. 11, in some examples, computer system 1100 may include two or more memory devices (e.g., dynamic memory and static memory).

Computer system 1100 may include communication interface device 1112, for direct communication with other computers (including wired and/or wireless communication) and/or for communication with a network. In some examples, computer system 1100 may include display device 1114 (e.g., a liquid crystal display (LCD), a touch sensitive display, etc.). In some examples, computer system 1100 may include user interface 1116 (e.g., an alphanumeric input device, a cursor control device, etc.).

In some examples, computer system 1100 may include data storage device 1110 storing instructions (e.g., software) for performing any one or more of the functions described herein. Data storage device 1110 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
at least one computer server configured to communicate with one or more entity systems and at least one user device, the at least one computer server comprising a non-transitory memory and a processor, the at least one computer server configured to:
receive, via one or more data feed interfaces, one or more baseline data structures from among the one or more entity systems;

generate an interactive graphical user interface (GUI) on a display of the at least one user device, the interactive GUI comprising one or more screens configured to display the one or more baseline data structures and one or more user adjustment tools for customizing characteristics of a displayed structure among the one or more baseline data structures;

generate, by a dynamic filtering component of the interactive GUI, a list of baseline data structures among the one or more baseline data structures, said list being generated to be particular to the at least one user device according to preprogrammed rules, said list including said displayed structure;

display, by the interactive GUI, said list of baseline data structures, including the displayed structure, on said one or more screens;

receive, from the at least one user device via the interactive GUI, at least one adjustment indication associated with the displayed structure via the one or more user adjustment tools;

adjust, responsive to the at least one adjustment indication, at least one characteristic among the characteristics of the displayed structure;

update, responsive to the adjusting of the at least one characteristic, at least one other characteristic among the characteristic of the displayed structure, thereby reflecting an impact of said adjusting on said at least one other characteristic;

dynamically display, via the interactive GUI on at least one among the one or more screens, the adjusting of the at least one characteristic and the impact of said adjusting on said at least one other characteristic as said adjusting occurs;

receive, from the at least one user device via the interactive GUI, input comprising a confirmation indication; and create a user-customized data structure responsive to the confirmation indication received from the at least one user device via the interactive GUI.

2. The system of claim 1, wherein the preprogrammed rules comprise user characteristics associated with a user of the at least one user device.

3. The system of claim 1, wherein the interactive GUI further comprises one or more builder tools configured to generate the interactive GUI and dynamically refresh the one or more screens of the interactive GUI.

4. The system of claim 1, wherein the interactive GUI is configured to dynamically refresh the one or more screens each time a new adjustment indication is received.

5. The system of claim 1, wherein the one or more data feed interfaces correspond to one or more real-time data feeds between the at least one computer server and the one or more entity systems.

6. The system of claim 1, the system further comprising a middleware engine for communication with the one or more data feed interfaces.

7. The system of claim 6, wherein the middleware engine is configured to at least one of reformat and normalize the one or more baseline data structures received from the one or more entity systems.

8. The system of claim 1, the system further configured to at least one of encrypt or decrypt data transmitted between the one or more entity systems and the at least one computer server.

9. The system of claim 1, the system further comprising at least one centralized database structure configured to securely store the one or more baseline data structures and the user-customized data structure.

10. The system of claim 1, wherein the one or more baseline data structures comprise a financial product including a liquid time deposit product.

11. The system of claim 10, wherein the characteristics of the displayed structure include one or more combinations of tenor, rate and frequency parameters.

12. The system of claim 10, wherein the at least one adjustment indication includes one or more of deposit tenor, notional amount, one or more liquidity events, one or more liquidity schedules, liquidity amount, maturity date, annual percentage yield (APY), and interest.

13. The system of claim 10, the system further comprising an automated data handling system configured to perform one or more data handling operations over one or more lifecycle stages of the user-customized data structure, the one or more data handling operations comprising at least one of funding and formulation across one or more funding systems, generating and transmitting details of the user-customized data structure to one or more servers, classification of user-customized data structure, generation of accounting entries, generation of regulatory and fiscal reports, generation of analytical reports, and data storage, initiating liquidity transactions, scheduling liquidity events, conducting transaction settlements, automated end-of-day operations, and generation of one or more processing actions for further downstream processing.

14. The system of claim 1, wherein the at least one computer server is configured to create the one or more baseline data structures.

15. The system of claim 1, wherein the one or more baseline data structures comprise an underlying data structure and the user-customized data structure is created without modifying the underlying data structure of the one or more baseline data structures.

16. The system of claim 1, further comprising a further interactive GUI, the further interactive GUI configured to at least one of display information associated with one or more data processing tasks and provide a search interface for searching of the one or more data processing tasks of the at least one computer server, said information including at least one of a progress and a status of the one or more data processing task.

17. A method, the method comprising:

receiving, by at least one computer server configured to communicate with one or more entity systems and at least one user device, via one or more data feed interfaces, one or more baseline data structures from among the one or more entity systems;

generating, by the at least one computer server, an interactive graphical user interface (GUI) on a display of the at least one user device, the interactive GUI comprising one or more screens configured to display the one or more baseline data structures and one or more user adjustment tools for customizing characteristics of a displayed structure among the one or more baseline data structures;

generating, by a dynamic filtering component of the interactive GUI, a list of baseline data structures among the one or more baseline data structures, said list being generated to be particular to the at least one user device according to preprogrammed rules, said list including said displayed structure;

displaying, by the interactive GUI, said list of baseline data structures, including the displayed structure, on said one or more screens;

receiving, by the at least one computer server, from the at least one user device via the interactive GUI, at least one adjustment indication associated with the displayed structure via the one or more user adjustment tools;

adjusting, by the at least one computer server, responsive to the at least one adjustment indication, at least one characteristic among the characteristics of the displayed structure;

updating, by the at least one computer server, responsive to the adjusting of the at least one characteristic, at least one other characteristic among the characteristic of the displayed structure, thereby reflecting an impact of said adjusting on said at least one other characteristic;

dynamically displaying, by the at least one computer server, via the interactive GUI on at least one among the one or more screens, the adjusting of the at least one characteristic and the impact of said adjusting on said at least one other characteristic as said adjusting occurs;

receiving, by the at least one computer server, from the at least one user device via the interactive GUI, input comprising a confirmation indication; and creating, by the at least one computer server, a user-customized data structure responsive to the confirmation indication received from the at least one user device via the interactive GUI.

18. The method of claim 17, wherein the preprogrammed rules comprise user characteristics associated with a user of the at least one user device.

19. The method of claim 17, further comprising generating the interactive GUI via one or more builder tools, the method further comprising dynamically refreshing the one or more screens of the interactive GUI.

20. The method of claim 17, the method further comprising:
dynamically refreshing, via the interactive GUI, the one or more screens each time a new adjustment indication is received.

21. The method of claim 17, the method further comprising:
at least one of reformatting and normalizing, by a middleware engine, the one or more baseline data structures received from the one or more entity systems.

22. The method of claim 17, the method further comprising:
at least one of encrypting or decrypting data transmitted between the one or more entity systems and the at least one computer server.

23. The method of claim 17, the method further comprising:
securely storing, via at least one centralized database structure, the one or more baseline data structures and the user-customized data structure.

24. The method of claim 17, wherein the one or more baseline data structures comprise a financial product including a liquid time deposit product.

25. The method of claim 24, wherein the characteristics of the displayed structure include one or more combinations of tenor, rate and frequency parameters.

26. The method of claim 24, wherein the at least one adjustment indication includes one or more of deposit tenor, notional amount, one or more liquidity events, one or more liquidity schedules, liquidity amount, maturity date, annual percentage yield (APY), and interest.

27. The method of claim 24, the method further comprising:
performing, by an automated data handling system of the at least one computer server, one or more data handling operations over one or more lifecycle stages of the user-customized data structure, the one or more data handling operations comprising at least one of funding and formulation across one or more funding systems, generating and transmitting details of the user-customized data structure to one or more servers, classification of user-customized data structure, generation of accounting entries, generation of regulatory and fiscal reports, generation of analytical reports, and data storage, initiating liquidity transactions, scheduling liquidity events, conducting transaction settlements, automated end-of-day operations, and generation of one or more processing actions for further downstream processing.

28. The method of claim 17, the method further comprising creating, by at least one computer server, the one or more baseline data structures.

29. The method of claim 17, wherein the one or more baseline data structures comprise an underlying data structure and the user-customized data structure is created without modifying the underlying data structure of the one or more baseline data structures.

30. A non-transitory computer readable medium storing computer readable instructions that, when executed by one or more processing devices, cause the one or more processing devices to perform the functions comprising:

receiving, via one or more data feed interfaces, one or more baseline data structures from among one or more entity systems;

generating an interactive graphical user interface (GUI) on a display of at least one user device, the interactive GUI comprising one or more screens configured to display the one or more baseline data structures and one or more user adjustment tools for customizing characteristics of a displayed structure among the one or more baseline data structures;

generating, by a dynamic filtering component of the interactive GUI, a list of baseline data structures among the one or more baseline data structures, said list being generated to be particular to the at least one user device according to preprogrammed rules, said list including said displayed structure;

displaying, by the interactive GUI, said list of baseline data structures, including the displayed structure, on said one or more screens;

receiving, from the at least one user device via the interactive GUI, at least one adjustment indication associated with the displayed structure via the one or more user adjustment tools;

adjusting, responsive to the at least one adjustment indication, at least one characteristic among the characteristics of the displayed structure;

updating, responsive to the adjusting of the at least one characteristic, at least one other characteristic among the characteristic of the displayed structure, thereby reflecting an impact of said adjusting of said at least one other characteristic;

dynamically displaying, via the interactive GUI on at least one among the one or more screens, the adjusting of the at least one characteristic and the impact of said adjusting on said at least one other characteristic as said adjusting occurs;

receiving, from the at least one user device via the interactive GUI, input comprising a confirmation indication; and creating a user-customized data structure responsive to the confirmation indication received from the at least one user device via the interactive GUI.

\* \* \* \* \*